(12) United States Patent
Rohatgi et al.

(10) Patent No.: US 11,584,816 B2
(45) Date of Patent: *Feb. 21, 2023

(54) BIMODAL POLYETHYLENE RESINS AND PIPES PRODUCED THEREFROM

(71) Applicant: Chevron Phillips Chemical Company LP, The Woodlands, TX (US)

(72) Inventors: Vivek Rohatgi, Owasso, OK (US); Ashish M. Sukhadia, Bartlesville, OK (US); Yongwoo Inn, Bartlesville, OK (US); Elizabeth M. Lanier, Bartlesville, OK (US)

(73) Assignee: Chevron Phillips Chemical Company LP, The Woodlands, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/547,341

(22) Filed: Dec. 10, 2021

(65) Prior Publication Data

US 2022/0098342 A1 Mar. 31, 2022

Related U.S. Application Data

(60) Continuation of application No. 16/774,061, filed on Jan. 28, 2020, now Pat. No. 11,225,538, which is a
(Continued)

(51) Int. Cl.
*C08F 210/16* (2006.01)
*C08F 10/02* (2006.01)
(Continued)

(52) U.S. Cl.
CPC .............. *C08F 210/16* (2013.01); *C08F 8/00* (2013.01); *C08F 10/02* (2013.01); *C08F 210/02* (2013.01);
(Continued)

(58) Field of Classification Search
CPC .............. C08F 10/02; C08F 210/02–16; C08F 2203/18; C08F 2500/04; C08F 2500/05;
(Continued)

(56) References Cited

U.S. PATENT DOCUMENTS 3,248,179 A  4/1966 Norwood
4,501,885 A  2/1985 Sherk
(Continued)

FOREIGN PATENT DOCUMENTS

JP  2009504847 A  2/2009
JP  2009515008 A  4/2009
(Continued)

OTHER PUBLICATIONS

Arnett, et al., "Zero-Shear Viscosity of Some Ethyl Branched Paraffinic Model Polymers," J. Phys. Chem., vol. 84, 1980, pp. 649-652.
(Continued)

*Primary Examiner* — Kregg T Brooks
(74) *Attorney, Agent, or Firm* — Merchant & Gould P.C.

(57) ABSTRACT

Disclosed herein are ethylene-based polymers generally characterized by a density of at least 0.94 g/cm³, a high load melt index from 4 to 20 g/10 min, a zero-shear viscosity at 190° C. from 20,000 to 400,000 kPa-sec, and a relaxation time at 190° C. from 225 to 3000 sec. These ethylene polymers can be produced by peroxide-treating a broad molecular weight distribution Ziegler-catalyzed resin, and can be used in large diameter, thick wall pipes and other end-use applications.

21 Claims, 2 Drawing Sheets

Related U.S. Application Data division of application No. 15/919,282, filed on Mar. 13, 2018, now Pat. No. 10,590,213.

(51) Int. Cl.

| | | |
|---|---|---|
| *C08L 23/08* | (2006.01) | |
| *C08K 5/14* | (2006.01) | |
| *C08F 8/00* | (2006.01) | |
| *C08F 210/02* | (2006.01) | |
| *C08L 23/06* | (2006.01) | |
| *F16L 9/12* | (2006.01) | |

(52) U.S. Cl.
CPC ............... *C08K 5/14* (2013.01); *C08L 23/06* (2013.01); *C08L 23/0815* (2013.01); *C08F 2500/01* (2013.01); *C08F 2500/04* (2013.01); *C08F 2500/05* (2013.01); *C08F 2500/08* (2013.01); *C08F 2500/17* (2013.01); *C08F 2810/10* (2013.01); *C08F 2810/20* (2013.01); *C08L 2203/18* (2013.01); *C08L 2205/025* (2013.01); *C08L 2205/03* (2013.01); *C08L 2207/066* (2013.01); *C08L 2314/02* (2013.01); *F16L 9/12* (2013.01)

(58) Field of Classification Search
CPC .............. C08F 2500/17; C08F 2810/10; C08F 2810/20; C08L 23/06–0815; C08L 2203/18; F16L 9/12
See application file for complete search history.

(56) References Cited

U.S. PATENT DOCUMENTS

| | | | |
|---|---|---|---|
| 4,588,790 | A | 5/1986 | Jenkins, III |
| 5,352,749 | A | 10/1994 | Dechellis |
| 5,436,304 | A | 7/1995 | Griffin |
| 5,565,175 | A | 10/1996 | Hottovy |
| 5,575,979 | A | 11/1996 | Hanson |
| 6,187,423 | B1 | 2/2001 | Maeger |
| 6,239,235 | B1 | 5/2001 | Hottovy |
| 6,262,191 | B1 | 7/2001 | Hottovy |
| 6,833,415 | B2 | 12/2004 | Kendrick |
| 7,300,983 | B2 | 11/2007 | Degroot |
| 7,531,606 | B2 | 5/2009 | Hendrickson |
| 7,598,327 | B2 | 10/2009 | Shaw |
| 7,625,982 | B2 | 12/2009 | Martin |
| 8,114,946 | B2 | 2/2012 | Yang |
| 8,426,538 | B2 | 4/2013 | Jensen |
| 8,822,608 | B1 | 9/2014 | Bhandarkar |
| 8,859,703 | B2 | 10/2014 | Coffy |
| 8,937,139 | B2 | 1/2015 | Hlavinka |
| 9,169,337 | B2 | 10/2015 | Rohatgi |
| 9,273,170 | B2 | 3/2016 | Hlavinka |
| 9,475,898 | B2 | 10/2016 | Rohatgi |
| 9,873,782 | B2 | 1/2018 | Cottle |
| 10,590,213 | B2 | 3/2020 | Rohatgi |
| 2005/0239638 | A1 | 10/2005 | Mcdaniel |
| 2005/0239976 | A1 | 10/2005 | Mcdaniel |
| 2007/0007680 | A1 | 1/2007 | Henri Barre |
| 2007/0037909 | A1 | 2/2007 | Sciamanna |
| 2007/0048472 | A1 | 3/2007 | Krishnaswamy |
| 2007/0232716 | A1 | 10/2007 | Guenther |
| 2008/0161526 | A1 | 7/2008 | Guenther |
| 2008/0226858 | A1 | 9/2008 | Walter |
| 2010/0092709 | A1 | 4/2010 | Joseph |
| 2010/0119751 | A1 | 5/2010 | Lanier |
| 2011/0174413 | A1 | 7/2011 | Ashbaugh |
| 2015/0065669 | A1 | 3/2015 | Hlavinka |
| 2015/0259444 | A1 | 9/2015 | Rohatgi |
| 2015/0259455 | A1 | 9/2015 | Hlavinka |
| 2016/0115264 | A1 | 4/2016 | Rohatgi |
| 2018/0030252 | A1 | 2/2018 | Mavridis |
| 2020/0157260 | A1 | 5/2020 | Rohatgi |

FOREIGN PATENT DOCUMENTS

| | | |
|---|---|---|
| JP | 2011168783 A | 9/2011 |
| JP | 2015532944 A | 11/2015 |
| WO | 2005108439 A2 | 11/2005 |
| WO | 2014186272 A1 | 11/2014 |
| WO | 2015034816 A2 | 3/2015 |
| WO | 2019177829 A1 | 9/2019 |

OTHER PUBLICATIONS

Bird, R. Byron, et al., "Dynamics of Polymeric Liquids," Fluid Mechanics, vol. 1, Second Edition, 1987, cover page, publishing page, pp. xiii-xviii, and 171-172, John Wiley & Sons, Inc.

Film Extrusion Manual—Process, Materials, Properties, TAPPI Press, 1992, 16 pages.

Hieber, C. A., et al., "Shear-rate-dependence modeling of polymer melt viscosity," Polymer Engineering and Science, Jul. 1992, pp. 931-938, vol. 32, No. 14.

Hieber, C. A., et al., "Some correlations involving the shear viscosity of polystyrene melts," Rheol Acta, 1989, pp. 321-332, vol. 28.

International Search Report and Written Opinion issued in corresponding application No. PCT/US2019/020870, dated Jun. 11, 2019, 9 pgs.

Modern Plastics Encyclopedia, Mid-Nov. 1995 Issue, vol. 72, No. 12, 3 pages.

Third Party Observation issued in corresponding application No. PCT/US2019/020870 dated Oct. 31, 2019, 2 pgs.

Yong W. Inn, et al., "Application of Creep Test to Obtain the Linear Viscoelastic Properties at Low Frequency Range tor Polyethylene Melts," Applied Rheology, vol. 22, Issue 1, 2012, 8 pgs.

Youlu Yu, et al., "Long Chain Branches in Metallocene-Catalyzed Polyethylene Determined by a Combination of SEC/Multi-Angle Light Scattering, NMR and Rheology," Polymer Preprint, vol. 44, 2003, pp. 49-50.

Search Report issued in corresponding Indian Application No. 202017035423, dated Feb. 9, 2022, 2 pps.

BIMODAL POLYETHYLENE RESINS AND PIPES PRODUCED THEREFROM

REFERENCE TO RELATED APPLICATIONS

This application is a continuation application of U.S. patent application Ser. No. 16/774,061, filed on Jan. 28, 2020, now U.S. Pat. No. 11,225,538, which is a divisional application of U.S. patent application Ser. No. 15/919,282, filed on Mar. 13, 2018, now U.S. Pat. No. 10,590,213, the disclosures of which are incorporated herein by reference in their entirety.

FIELD OF THE INVENTION

The present disclosure generally relates to the peroxide treatment of a polyolefin base resin to produce a high molecular weight ethylene polymer, and the subsequent use of the ethylene polymer to produce large diameter, thick wall pipes where slump or sag can be a limiting factor.

BACKGROUND OF THE INVENTION

Polyolefins such as high density polyethylene (HDPE) homopolymer and linear low density polyethylene (LLDPE) copolymer can be produced using various combinations of catalyst systems and polymerization processes. Metallocene-based catalyst systems can, for example, produce ethylene polymers having good impact strength, tear resistance, and optical properties, but often at the expense of poor extrusion processability and melt strength. Chromium-based catalyst systems can, for example, produce ethylene polymers having good extrusion processability and polymer melt strength in certain pipe applications, typically due to their broad molecular weight distribution (MWD).

However, it can be difficult for metallocene-based and chromium-based catalyst systems to produce polymers that can be successfully extruded into large diameter and thick wall pipe products. Accordingly, it is to this end that the present invention is generally directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

The present invention generally relates to ethylene polymers (e.g., comprising an ethylene/α-olefin copolymer) characterized by a density of at least about 0.94 g/cm$^3$, a HLMI ($I_{21}$) in a range from about 4 to about 20 g/10 min, a zero-shear viscosity ($\eta_0$) at 190° C. in a range from about 20,000 to about 400,000 kPa-sec, and a relaxation time ($\tau_\eta$) at 190° C. in a range from about 225 to about 3000 sec. For example, the ethylene polymer can have a density in a range from about 0.94 to about 0.96 g/cm$^3$, a HLMI ($I_{21}$) in a range from about 4 to about 18 g/10 min, a zero-shear viscosity ($\eta_0$) at 190° C. in a range from about 30,000 to about 300,000 kPa-sec, and a relaxation time ($\tau_\eta$) at 190° C. in a range from about 250 to about 2500 sec. These ethylene polymers can be used to produce various articles of manufacture, such as large diameter, thick wall pipes.

These ethylene polymers can be produced, for instance, by a process comprising contacting a base resin (e.g., an ethylene copolymer) with a peroxide compound to produce the ethylene polymer. In some aspects, the contacting step can comprise a step of melt processing a blend or mixture of the base resin and the peroxide compound at a suitable melt processing temperature, and often, the amount of peroxide groups ranges from about 60 to about 200 ppm by weight of the base resin. Generally, the base resin can be characterized by a density of at least about 0.94 g/cm$^3$, a HLMI ($I_{21}$) in a range from about 4 to about 25 g/10 min, a Mw in a range from about 200,000 to about 500,000 g/mol, and a ratio of Mw/Mn in a range from about 12 to about 40.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects and embodiments may be directed to various feature combinations and sub-combinations described in the detailed description.

DEFINITIONS

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter are described such that, within particular aspects, a combination of different features can be envisioned. For each and every aspect and/or feature disclosed herein, all combinations that do not detrimentally affect the articles/pipes, compositions/polymers, and/or processes/methods described herein are contemplated with or without explicit description of the particular combination. Additionally, unless explicitly recited otherwise, any aspect and/or feature disclosed herein can be combined to describe inventive features consistent with the present disclosure.

While articles/pipes, compositions/polymers, and processes/methods are described herein in terms of "comprising" various components or steps, the articles/pipes, compositions/polymers, and processes/methods can also "consist essentially of" or "consist of" the various components or steps, unless stated otherwise.

The terms "a," "an," "the," etc., are intended to include plural alternatives, e.g., at least one, unless otherwise specified. For instance, the disclosure of "an additive" or "a comonomer" is meant to encompass one, or mixtures or combinations of more than one, additive or comonomer, respectively, unless otherwise specified.

Generally, groups of elements are indicated using the numbering scheme indicated in the version of the periodic table of elements published in *Chemical and Engineering News*, 63(5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

For any particular compound disclosed herein, the general structure or name presented is also intended to encompass all structural isomers, conformational isomers, and stereoisomers that can arise from a particular set of substituents, unless indicated otherwise. Thus, a general reference to a compound includes all structural isomers unless explicitly indicated otherwise; e.g., a general reference to pentane includes n-pentane, 2-methyl-butane, and 2,2-dimethylpropane, while a general reference to a butyl group includes an n-butyl group, a sec-butyl group, an iso-butyl group, and a tert-butyl group. Additionally, the reference to a general structure or name encompasses all enantiomers, diastereomers, and other optical isomers whether in enantiomeric or racemic forms, as well as mixtures of stereoisomers, as the context permits or requires. For any particular formula or name that is presented, any general formula or name presented also encompasses all conformational isomers, regioisomers, and stereoisomers that can arise from a particular set of substituents.

The term "polymer" is used herein generically to include olefin homopolymers, copolymers, terpolymers, and the like, as well as alloys and blends thereof. The term "polymer" also includes impact, block, graft, random, and alternating copolymers. A copolymer is derived from an olefin monomer and one olefin comonomer, while a terpolymer is derived from an olefin monomer and two olefin comonomers. Accordingly, "polymer" encompasses copolymers and terpolymers derived from any olefin monomer and comonomer(s) disclosed herein. Similarly, the scope of the term "polymerization" includes homopolymerization, copolymerization, and terpolymerization. Therefore, an ethylene polymer would include ethylene homopolymers, ethylene copolymers (e.g., ethylene/α-olefin copolymers), ethylene terpolymers, and the like, as well as blends or mixtures thereof. Thus, an ethylene polymer encompasses polymers often referred to in the art as LLDPE (linear low density polyethylene) and HDPE (high density polyethylene). As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer can be categorized an as ethylene/1-hexene copolymer. The term "polymer" also includes all possible geometrical configurations, unless stated otherwise, and such configurations can include isotactic, syndiotactic, and random symmetries. Moreover, the "polymers" disclosed herein (e.g., an ethylene polymer, a base resin) also can be referred to herein as "polymer compositions."

The term "contacting" is used herein to refer to materials or components which can be blended, mixed, slurried, dissolved, reacted, treated, compounded, or otherwise contacted or combined in some other manner or by any suitable method. The materials or components can be contacted together in any order, in any manner, and for any length of time, unless otherwise specified.

Although any methods, devices, and materials similar or equivalent to those described herein can be used in the practice or testing of the invention, the typical methods, devices, and materials are herein described.

All publications and patents mentioned herein are incorporated herein by reference for the purpose of describing and disclosing, for example, the constructs and methodologies that are described in the publications, which might be used in connection with the presently described invention.

Several types of ranges are disclosed in the present invention. When a range of any type is disclosed or claimed, the intent is to disclose or claim individually each possible number that such a range could reasonably encompass, including end points of the range as well as any sub-ranges and combinations of sub-ranges encompassed therein. As a representative example, the high load melt index (HLMI) of the ethylene polymer can be in certain ranges in various aspects of this invention. By a disclosure that the HLMI can be in a range from about 4 to about 18 g/10 min, the intent is to recite that the HLMI can be any value within the range and, for example, can be equal to about 4, about 5, about 6, about 7, about 8, about 9, about 10, about 11, about 12, about 13, about 14, about 15, about 16, about 17, or about 18 g/10 min. Additionally, the HLMI can be within any range from about 4 to about 18 g/10 min (for example, from about 6 to about 14 g/10 min), and this also includes any combination of ranges between about 4 and about 18 g/10 min (for example, the HLMI can be in a range from about 4 to about 8 g/10 min, or from about 10 to about 16 g/10 min). Likewise, all other ranges disclosed herein should be interpreted in a manner similar to this example.

The term "about" means that amounts, sizes, formulations, parameters, and other quantities and characteristics are not and need not be exact, but can be approximate and/or larger or smaller, as desired, reflecting tolerances, conversion factors, rounding off, measurement errors, and the like, and other factors known to those of skill in the art. In general, an amount, size, formulation, parameter or other quantity or characteristic is "about" or "approximate" whether or not expressly stated to be such. The term "about" also encompasses amounts that differ due to different equilibrium conditions for a composition resulting from a particular initial mixture. Whether or not modified by the term "about," the claims include equivalents to the quantities. The term "about" can mean within 10% of the reported numerical value, preferably within 5% of the reported numerical value.

DETAILED DESCRIPTION OF THE INVENTION

The present invention is directed generally to high molecular weight ethylene-based polymers having excellent melt strength and a broad molecular weight distribution. Articles of manufacture, such as large diameter and thick wall pipes, can be produced from these ethylene-based polymers without slump or sag, and at commercially-acceptable production rates.

Ethylene Polymers

Generally, the polymers disclosed herein are ethylene-based polymers, or ethylene polymers, encompassing homopolymers of ethylene as well as copolymers, terpolymers, etc., of ethylene and at least one olefin comonomer. Comonomers that can be copolymerized with ethylene often can have from 3 to 20 carbon atoms in their molecular chain. For example, typical comonomers can include, but are not limited to, propylene, 1-butene, 1-pentene, 1-hexene, 1-heptene, 1-octene, and the like, or combinations thereof. In an aspect, the olefin comonomer can comprise a $C_3$-$C_{18}$ olefin;

alternatively, the olefin comonomer can comprise a $C_3$-$C_{10}$ olefin; alternatively, the olefin comonomer can comprise a $C_4$-$C_{10}$ olefin; alternatively, the olefin comonomer can comprise a $C_3$-$C_{10}$ α-olefin; alternatively, the olefin comonomer can comprise a $C_4$-$C_{10}$ α-olefin; alternatively, the olefin comonomer can comprise 1-butene, 1-hexene, 1-octene, or any combination thereof or alternatively, the comonomer can comprise 1-hexene. Typically, the amount of the comonomer, based on the total weight of monomer (ethylene) and comonomer, can be in a range from about 0.01 to about 20 wt. %, from about 0.1 to about 10 wt. %, from about 0.5 to about 15 wt. %, from about 0.5 to about 8 wt. %, or from about 1 to about 15 wt. %.

In one aspect, the ethylene polymer of this invention can comprise an ethylene/α-olefin copolymer, while in another aspect, the ethylene polymer can comprise an ethylene homopolymer, and in yet another aspect, the ethylene polymer of this invention can comprise an ethylene/α-olefin copolymer and an ethylene homopolymer. For example, the ethylene polymer can comprise an ethylene/1-butene copolymer, an ethylene/1-hexene copolymer, an ethylene/1-octene copolymer, an ethylene homopolymer, or any combination thereof; alternatively, an ethylene/1-butene copolymer, an ethylene/1-hexene copolymer, an ethylene/1-octene copolymer, or any combination thereof; or alternatively, an ethylene/1-hexene copolymer.

Ethylene polymers disclosed herein can be produced using a Ziegler-Natta catalyst system, and these polymers have a unique combination of processability and physical properties needed for the production of large diameter pipes with thick walls, where excessive slump or sag can be an issue. An illustrative and non-limiting example of an ethylene polymer (e.g., comprising an ethylene copolymer) of the present invention can have a density of at least about 0.94 g/cm³, a HLMI ($I_{21}$) in a range from about 4 to about 20 g/10 min, a zero-shear viscosity ($\eta_0$) at 190° C. in a range from about 20,000 to about 400,000 kPa-sec, and a relaxation time ($\tau_\eta$) at 190° C. in a range from about 225 to about 3000 sec. Another illustrative and non-limiting example of an ethylene polymer (e.g., comprising an ethylene copolymer) of the present invention can have a density in a range from about 0.94 to about 0.96 g/cm³, a HLMI ($I_{21}$) in a range from about 4 to about 18 g/10 min, a zero-shear viscosity ($\eta_0$) at 190° C. in a range from about 30,000 to about 300,000 kPa-sec, and a relaxation time ($\tau_\eta$) at 190° C. in a range from about 250 to about 2500 sec. These illustrative and non-limiting examples of ethylene polymers consistent with the present invention also can have any of the polymer properties listed below and in any combination, unless indicated otherwise.

The densities of ethylene-based polymers disclosed herein often are greater than or equal to about 0.94 g/cm³, for example, greater than or equal to about 0.942 g/cm³, or greater than or equal to about 0.945 g/cm³. Yet, in particular aspects, the density can be in a range from about 0.94 to about 0.96 g/cm³, from about 0.94 to about 0.955 g/cm³, from about 0.94 to about 0.95 g/cm³, from about 0.945 to about 0.96 g/cm³, from about 0.942 to about 0.958 g/cm³, or from about 0.942 to about 0.952 g/cm³.

While not being limited thereto, ethylene polymers described herein often can have a high load melt index (HLMI, $I_{21}$) in a range from about 4 to about 20 g/10 min, from about 4 to about 18 g/10 min, or from about 4 to about 16 g/10 min. In further aspects, ethylene polymers described herein can have a HLMI in a range from about 5 to about 18 g/10 min, from about 5 to about 15 g/10 min, from about 5 to about 12 g/10 min, from about 6 to about 18 g/10 min, from about 6 to about 16 g/10 min, or from about 6 to about 14 g/10 min.

The ethylene polymers described herein have a very high zero-shear viscosity ($\eta_0$) at 190° C., which translates into excellent polymer melt strength, and slump or sag resistance in pipe extrusion. In some aspects, the ethylene polymer can have a zero-shear viscosity ($\eta_0$) at 190° C. in a range from about 20,000 to about 400,000 kPa-sec; alternatively, from about 30,000 to about 300,000 kPa-sec; alternatively, from about 30,000 to about 275,000 kPa-sec; alternatively, from about 35,000 to about 275,000 kPa-sec; alternatively, from about 20,000 to about 250,000 Pa-sec; alternatively, from about 25,000 to about 250,000 kPa-sec; alternatively, from about 25,000 to about 230,000 kPa-sec; or alternatively, from about 30,000 to about 215,000 kPa-sec. The zero-shear viscosity is determined from viscosity data measured at 190° C. and using the Carreau-Yasuda (CY) empirical model as described herein, with creep adjustment.

Also indicative of the excellent polymer melt strength and slump or sag resistance in pipe extrusion, the disclosed ethylene polymers can have a relaxation time ($\tau_\eta$) at 190° C. in a range from about 225 to about 3000 sec. In some aspects, the relaxation time ($\tau_\eta$) at 190° C. can be in a range from about 250 to about 2500 sec, or from about 275 to about 2000 sec, while in other aspects, the relaxation time can range from about 300 to about 2500 sec, or from about 300 to about 2000 sec. Like zero-shear viscosity, the relaxation time ($\tau_\eta$) at 190° C. is determined from viscosity data measured at 190° C. and using the Carreau-Yasuda (CY) empirical model as described herein, with creep adjustment.

Generally, ethylene polymers consistent with aspects of the present invention have levels of long chain branches (LCB) per 1000 total carbon atoms in a range from about 5 to about 50, from about 5 to about 35, or from about 5 to about 32 LCB per million total carbon atoms. In some aspects, the number of LCB per million total carbon atoms can be in a range from about 6 to about 28, from about 6 to about 26, or from about 7 to about 20 LCB, per million total carbon atoms. The presence of LCB can improve polymer melt strength and reduce or eliminate slump or sag in pipe extrusion.

Further, the ethylene polymers can be characterized by an average number of LCB per Mw (vf) and, typically, this falls within a range from about 0.15 to about 0.51. For example, the average number of LCB per Mw (vf) can be in range from about 0.16 to about 0.43, or from about 0.18 to about 0.37.

Moreover, the ethylene polymers typically have a reverse short chain branching distribution (reverse SCBD or reverse comonomer distribution, increasing comonomer distribution). A reverse SCBD can be characterized by the number of short chain branches (SCB) per 1000 total carbon atoms of the ethylene polymer at Mw that is greater than at Mn, and/or the number of SCB per 1000 total carbon atoms of the ethylene polymer at Mz that is greater than at Mn. The presence of more SCB at higher molecular weights can result in an ethylene polymer with improved toughness and strength properties.

Further indicators of the excellent melt strength and slump or sag resistance of the disclosed ethylene polymers are the CY-a parameter, the viscosity at a shear rate of 0.01 sec$^{-1}$, and the viscosity at a shear rate of 0.001 sec$^{-1}$ (all measured at 190° C.). The CY-a parameter at 190° C. generally falls within a range from about 0.06 to about 0.25, such as from about 0.09 to about 0.2, from about 0.1 to about 0.18, from about 0.1 to about 0.16, or from about 0.12 to about 0.15. The viscosity at 0.01 sec$^{-1}$ {η(0.01)} of the polymer at 190° C. generally falls within a range from about 300 to about 800 kPa-sec, such as from about 400 to about 700, from about 450 to about 750, from about 500 to about 750, or from about 500 to about 650 kPa-sec. The viscosity at 0.001 sec$^{-1}$ {η(0.001)} at 190° C. generally falls within a range from about 800 to about 3000 kPa-sec, such as from about 900 to about 2800, from about 1000 to about 2600, from about 1000 to about 2300, from about 1200 to about 2100, or from about 1300 to about 1900 kPa-sec. These viscosities and the CY-a parameter are determined from viscosity data measured at 190° C. and using the Carreau-Yasuda (CY) empirical model as described herein, with creep adjustment.

While not being limited thereto, the disclosed ethylene polymers often can have a 15 melt index (I$_5$) in a range from about 0.02 to about 0.3 g/10 min, from about 0.02 to about 0.25 g/10 min, or from about 0.02 to about 0.18 g/10 min. In further aspects, the ethylene polymer can have a 15 in a range from about 0.03 to about 0.3 g/10 min, from about 0.03 to about 0.25 g/10 min, from about 0.05 to about 0.3 g/10 min, from about 0.05 to about 0.18 g/10 min, from about 0.06 to about 0.3 g/10 min, or from about 0.06 to about 0.15 g/10 min.

Ethylene polymers consistent with various aspects of the present invention generally have a broad molecular weight distribution, and often with a weight-average molecular weight (Mw) in a range from about 200,000 to about 500,000 g/mol, from about 220,000 to about 500,000 g/mol, from about 210,000 to about 400,000 g/mol, from about 230,000 to about 380,000 g/mol, or from about 250,000 to about 360,000 g/mol, and the like. The ratio of Mw/Mn, or the polydispersity index, for the ethylene polymers of this invention often can be greater than or equal to about 12 and less than or equal to about 40. Accordingly, suitable ranges for the ratio of Mw/Mn can include from about 12 to about 40, from about 13 to about 38, from about 14 to about 39, from about 16 to about 37, or from about 18 to about 35, and the like.

The ethylene polymers disclosed herein have excellent strength and durability properties. In an aspect, the ethylene polymer can be further characterized by a percent elongation at break (ASTM D638) that falls within a range from about 450 to about 850%, from about 500 to about 800%, or from about 550 to about 750%. Additionally or alternatively, the ethylene polymer can be characterized by a yield strength (ASTM D638) ranging from about 3000 to about 5000 psi, from about 3500 to about 4500 psi, or from about 3500 to about 4000 psi. Additionally or alternatively, the ethylene polymer can be characterized by an oxidative induction temperature (OIT, ASTM D3895) of at least about 200° C., at least about 220° C., or at least about 240° C. Additionally or alternatively, the ethylene polymer can be characterized by a Charpy ductile to brittle transition temperature (ASTM F2231) in a range from about −35 to about −5° C., or from about −30 to about −10° C.

Beneficially, the disclosed ethylene polymers can be capable of producing (or configured to produce) a pipe product having at least a 24-inch diameter and at least a 2-inch wall thickness. For example, a pipe product having a 78-inch diameter and a 3-inch wall thickness can be produced without any slump or sag with the disclosed ethylene polymers, and unexpectedly, this is not possible with high melt strength chromium-catalyzed polymers. Further, despite the high molecular weight of the ethylene polymer, it has a relatively low gel content. Typically, this is quantified by less than 300 gels/ft$^2$, for gel sizes of at least 200 microns, when extruded at a specific energy of less than 0.25 kW-hr/kg. Given the high molecular weight of the ethylene polymer, this gel level is unexpectedly low.

The ethylene polymer can be in any suitable form, such as fluff, powder, granulate, pellet, and the like. Often, the ethylene polymer is in pellet form. The ethylene polymer can contain one or more additives, non-limiting examples of which can include an antioxidant, an acid scavenger, an antiblock additive, a slip additive, a colorant, a filler, a processing aid, a UV inhibitor, and the like, as well as combinations thereof. For instance, the colorant can be black (carbon black), white (titanium dioxide), or yellow for certain pipe applications. Thus, in accordance with an aspect of this invention, the ethylene polymer can further comprise from about 0.5 to about 5 wt. %, from about 1 to about 4 wt. %, or from about 2 to about 3 wt. %, of carbon black, although not limited thereto. This weight percentage is based on the total weight of the ethylene polymer (inclusive of all additives).

Often, the ethylene polymer can contain an acid scavenger, such as zinc stearate, calcium stearate, hydrotalcite, and the like, or combinations thereof. Typical loadings, based on the total weight of the ethylene polymer, include from about 100 ppm to about 1000 ppm, from about 250 ppm to about 800 ppm, or from about 350 ppm to about 750 ppm, of acid scavenger. Additionally or alternatively, the ethylene polymer can contain a processing aid, such as a fluoroelastomer or a fluoropolymer; combinations of two or more processing aids can be used. Typical loadings, based on the total weight of the ethylene polymer, include from about 100 ppm to about 1000 ppm, from about 250 ppm to about 750 ppm, or from about 300 ppm to about 600 ppm, of processing aid.

Additionally or alternatively, the ethylene polymer can contain a phenolic antioxidant, such as IRGANOX 1010 (pentaerythritol tetrakis(3-(3,5-di-tert-butyl-4-hydroxyphenyl) propionate), IRGANOX 1076 (octadecyl-3-(3,5-di-tertbutyl-4-hydroxyphenyl) propionate), IRGANOX 1330 (1,3,5-trimethyl-2,4,6-tris(3,5-di-tert-butyl-4-hydroxybenzyl) benzene), and the like, or any combination thereof. Typical loadings, based on the total weight of the ethylene polymer, include from about 250 ppm to about 5000 ppm; alternatively, from about 500 ppm to about 5000 ppm; alternatively, from about 1000 ppm to about 4500 ppm; alternatively, from about 1500 ppm to about 4000 ppm; or alternatively, from about 2000 ppm to about 3500 ppm, of phenolic antioxidant.

Additionally or alternatively, the ethylene polymer can contain a phosphite antioxidant, such as IRGAFOS 168 (tris(2,4,6-di-tert-butylphenyl) phosphite), ULTRANOX 627A (bis(2,4-di-t-butylphenyl) pentaerythritol diphosphite plus stabilizer), ULTRANOX 626 (bis(2,4-di-t-butylphenyl) pentaerythritol diphosphite), PEP-36 (bis(2,6-di-tert-butyl-4-methylphenyl) pentaerythritol diphosphate), DOVERPHOS 9228T (bis(2,4-dicumylphenyl) pentaerythritol diphosphite), and the like, or any combination thereof. Typical loadings, based on the total weight of the ethylene polymer, include from about 250 ppm to about 5000 ppm; alternatively, from about 250 ppm to about 4000 ppm; alternatively, from about 250 ppm to about 3000 ppm; alternatively, from about 500 ppm to about 5000 ppm; alternatively, from about 500 ppm to about 3500 ppm; alternatively, from about 500 ppm to about 2500 ppm; alternatively, from about 700 ppm to about 5000 ppm; alternatively, from about 700 ppm to about 4000 ppm; alternatively, from about 700 ppm to about 2500 ppm; alternatively, from about 1000 ppm to about 5000 ppm; or alternatively, from about 1000 ppm to about 3500 ppm, of phosphite antioxidant.

Generally, the total amount of antioxidant(s) present in the ethylene polymer is less than or equal to about 5000 ppm, although this is not a requirement. Thus, in some aspects, the total phenolic and phosphite antioxidant loading in the ethylene polymer can be less than or equal to about 5000 ppm, 4500 ppm, or 4000 ppm.

Optionally, the ethylene polymer can further contain one or more suitable UV inhibitors (inclusive of UV absorbers and hindered amine light stabilizers (HALS)). When present, the total UV inhibitor content often can range from about 250 ppm to about 7500 ppm; alternatively, from about 250 ppm to about 6500 ppm; alternatively, from about 250 ppm to about 5000 ppm; alternatively, from about 500 ppm to about 6000 ppm; alternatively, from about 500 ppm to about 4000 ppm; or alternatively, from about 1000 ppm to about 5000 ppm, of UV inhibitor.

Consistent with aspects of the present invention, the ethylene polymer can be produced from a base resin (discussed herein below) via a process comprising contacting the base resin with a peroxide compound to produce the ethylene polymer (any ethylene polymer disclosed herein). Generally, the amount (ppm by weight) of the peroxide compound used in the process is of lesser interest, because the amount of peroxide groups is more important, and the molecular weight and the number of peroxide groups per peroxide compound are not consistent amongst all suitable peroxide compounds. Generally, the amount of peroxide groups, based on the weight of the base resin, can be in a range from about 60 to about 200 ppm, from about 75 to about 175 ppm, or from about 100 to about 150 ppm, of peroxide groups, based on the weight of the base resin.

The base resin and the peroxide compound, therefore, can be contacted at a temperature sufficient to generate peroxide groups at about 60 to about 200 ppm, from about 75 to about 175 ppm, or from about 100 to about 150 ppm, of peroxide groups, based on the weight of the base resin.

In an aspect, the step of contacting the base resin with the peroxide compound can comprise melt processing a blend (or mixture) of the base resin and the peroxide compound at any suitable melt processing temperature, such as, for example, a temperature in a range from about 120 to about 300° C., a temperature in a range from about 150 to about 250° C., a temperature in a range from about 175 to about 225° C., and so forth. The appropriate temperature may depend upon the composition of the peroxide compound and the temperature at which it liberates peroxide groups. Prior to contacting the peroxide compound, the base resin can be in any suitable form including, for example, fluff, powder, granulate, pellet, solution, slurry, emulsion, and the like. Similarly, the peroxide compound can be in solid form, in liquid form, in a solution, or in a slurry. One particular method uses a masterbatch of the peroxide compound, and contacts the base resin (in fluff form) during melt processing. The masterbatch of the peroxide compound can contain any suitable organic or inorganic carrier, but often contains a high melt flow carrier resin, such as a polyethylene or polypropylene.

The present invention is not limited to any particular method of contacting and melt processing the base resin and the peroxide compound. Various methods of mixing and/or compounding can be employed, as would be recognized by those of skill in the art. In one aspect, the melt processing of the base resin and the peroxide compound can be performed in a single screw extrusion system. In another aspect, the melt processing of the base resin and the peroxide compound can be performed in a twin screw extrusion system (e.g., a counter-rotating mixer or a co-rotating twin screw extrusion system). The twin screw extrusion system can include any combination of feeding, melting, mixing, and conveying elements. For instance, the twin screw extrusion system can contain all or a majority of mixing elements.

The peroxide compound can be any compound containing one or more peroxide (O-O) groups, suitable examples of which can include, but are not limited to, 2,5-dimethyl-2,5-di(t-butylperoxy)hexane, dicumyl peroxide, t-butyl cumyl peroxide, n-butyl-4,4'-di(t-butylperoxy)valerate, and the like. The peroxide compound can be, for instance, added as a solid prill, dissolved in a mineral oil, or in a liquid form.

One or more additives also can be added during the conversion of the base resin (and peroxide compound) to the ethylene polymer. Non-limiting examples of suitable additives can include an antioxidant, an acid scavenger, an antiblock additive, a slip additive, a colorant, a filler, a processing aid, a UV inhibitor, and the like. Combinations of two or more additives can be contacted with the base resin and the peroxide compound, if desired.

Articles and Pipe Products

Articles of manufacture can be formed from, and/or can comprise, any of the ethylene polymers of this invention and, accordingly, are encompassed herein. For example, articles which can comprise ethylene polymers of this invention can include, but are not limited to, an agricultural film, an automobile part, a bottle, a container for chemicals, a drum, a fiber or fabric, a food packaging film or container, a food service article, a fuel tank, a geomembrane, a household container, a liner, a molded product, a medical device or material, an outdoor storage product, outdoor play equipment, a pipe, a sheet or tape, a toy, or a traffic barrier, and the like. Various processes can be employed to form these articles. Non-limiting examples of these processes include injection molding, blow molding, rotational molding, film extrusion, sheet extrusion, profile extrusion, thermoforming, and the like. Additionally, additives and modifiers often are added to these polymers in order to provide beneficial polymer processing or end-use product attributes. Such processes and materials are described in *Modern Plastics Encyclopedia*, Mid-November 1995 Issue, Vol. 72, No. 12; and *Film Extrusion Manual—Process, Materials, Properties*, TAPPI Press, 1992; the disclosures of which are incorporated herein by reference in their entirety. In some aspects of this invention, an article of manufacture can comprise any of ethylene polymers described herein, and the article of manufacture can be or can comprise a large diameter pipe.

In some aspects, the article produced from and/or comprising any of the ethylene polymers disclosed herein is a pipe product. For instance, the pipe can be characterized by any of the properties of the ethylene polymers disclosed herein. Thus, the pipe can be characterized by (e.g., a sample of the pipe product can be analyzed and determined to have) a density of at least about 0.94 g/cm$^3$, a HLMI ($I_{21}$) in a range from about 4 to about 20 g/10 min, a zero-shear viscosity ($\eta_0$) at 190° C. in a range from about 20,000 to about 400,000 kPa-sec, and a relaxation time ($\tau_\eta$) at 190° C. in a range from about 225 to about 3000 sec.

The pipe also can contain one or more additives, non-limiting examples of which can include an antioxidant, an acid scavenger, an antiblock additive, a slip additive, a colorant, a filler, a processing aid, a UV inhibitor, and the like. Combinations of two or more additives can be present in the pipe product. As would be recognized by those of skill in the art, certain additives can increase the density of the ethylene polymer or the pipe product, such as antiblock additives and colorants (e.g., carbon black). Thus, a black ethylene polymer (or a black pipe product) can have a density that is 0.01-0.04 g/cm³, or more, greater than that of a natural ethylene polymer (or a natural pipe product), which does not contain an antiblock and/or a colorant. Accordingly, the density of colored ethylene polymers (or colored pipe products) can range from about 0.94 g/cm³ to about 1.05 g/cm³, from about 0.945 to about 1.04 g/cm³, from about 0.95 to about 1.04 g/cm³, or from about 0.95 to about 1.02 g/cm³.

The wall thickness of the pipe product is not particularly limited, and can range from about 0.1 to about 5 inches, from about 0.5 to about 5 inches, from about 1 to about 4 inches, or from about 2 to about 3 inches. However, the ethylene polymers disclosed herein are well suited for the production of thick-wall pipe, which depending upon the end-use application, can have wall thicknesses of at least about 2 inches, and often can range up to 3 to 5 inches.

Likewise, the diameter (outside diameter) of the pipe is not limited to any particular range. Pipe products having outer pipe diameters of from about ¼ to about 100 inches, from about 3 to about 12 inches, from about 12 to about 100 inches, or from about 24 to about 63 inches, are encompassed herein. As above, the ethylene polymers disclosed herein are well suited for the production of large diameter pipe, which depending upon the end-use application, can have outer diameters of at least about 24 inches, and often can range up to 36-100 inches, or 36-60 inches.

In one aspect of this invention, the pipe can have a hydrostatic strength of 1600 psi at 23° C. for 100,000 hr, while in another aspect, the pipe can have a hydrostatic strength of 1000 psi at 60° C. for 100,000 hr, and in yet another aspect, the pipe can have both a hydrostatic strength of 1600 psi at 23° C. for 100,000 hr and a hydrostatic strength of 1000 psi at 60° C. for 100,000 hr. These parameters are measured in accordance with ASTM D1598 and ASTM D2837.

The pipe products disclosed herein have excellent performance in chlorinated water environments. As an example, the pipe can have a failure time of at least 1200 hr under chlorinated water conditions at 90° C. and 450 psi (ASTM F2263-07e1). In further aspects, the pipe can have a failure time of at least 3400 hr, or at least 7400 hr, under chlorinated water conditions at 90° C. and 450 psi (ASTM F2263-07e1). The pipe can have a failure time that may range as high as 8000-9500 hours, but the test is typically stopped after a specified number of hours is reached (e.g., 1200 hr or 3400 hr or 7400 hr), and given the long duration of test, the upper limit (in hours) is generally not determined.

As disclosed herein, the pipe product can contain any combination of additives suitable for the end-use application of the pipe. For example, a black pipe product can contain from about 0.5 to about 5 wt. %, from about 1 to about 4 wt. %, or from about 2 to about 3 wt. %, or carbon black, based on the total weight of the pipe. In addition to colorants, other suitable pipe additives include antioxidants, acid scavengers, antiblock additives, slip additives, fillers, processing aids, UV inhibitors, and the like, as well as combinations thereof. Similar to the ethylene polymers described hereinabove, the pipe often can contain one of more of an acid scavenger, processing aid, phenolic antioxidant, and phosphite antioxidant. Selections for these additives and typical addition amounts can be the same as those described above in relation to the ethylene polymer.

Also contemplated herein is a method for making or forming a pipe comprising any ethylene polymer disclosed herein. One such method can comprise melt processing the ethylene polymer through a pipe die to form the pipe. Moreover, any suitable means of melt processing can be employed, although extrusion typically can be utilized. As above, one or more additives can be combined with the ethylene polymer in the melt processing step (extrusion step), such as antioxidants, acid scavengers, antiblock additives, slip additives, colorants, fillers, processing aids, UV inhibitors, and the like, as well as combinations thereof. Thus, the method of making a pipe can comprise melt processing the ethylene polymer and at least one additive through the pipe die to form the pipe.

Pipes formed by these methods also are encompassed herein, and the pipes formed by these methods can have any of the properties or characteristics of the ethylene polymer and/or pipe product disclosed herein.

Base Resins

Generally, the base resin used to produce the ethylene polymer can be any homopolymer of ethylene or copolymer, terpolymer, etc., of ethylene and at least one olefin comonomer disclosed hereinabove for the ethylene polymer. Thus, the base resin can comprise an ethylene/α-olefin copolymer, while in another aspect, the base resin can comprise an ethylene homopolymer, and in yet another aspect, the base resin can comprise an ethylene/α-olefin copolymer and an ethylene homopolymer. Accordingly, the base resin can comprise an ethylene/1-butene copolymer, an ethylene/1-hexene copolymer, an ethylene/1-octene copolymer, an ethylene homopolymer, or any combination thereof alternatively, an ethylene/1-butene copolymer, an ethylene/1-hexene copolymer, an ethylene/1-octene copolymer, or any combination thereof; or alternatively, an ethylene/1-hexene copolymer. Typically, for example, if the base resin is an ethylene/1-hexene copolymer, then the ethylene polymer produced from the base resin also is an ethylene/1-hexene copolymer, although mixtures and combinations of various types of homopolymers and copolymers can be used.

In order to produce an ethylene polymer having the properties and benefits disclosed herein, a suitable base resin is used. An illustrative and non-limiting example of a base resin (e.g., comprising an ethylene copolymer) of the present invention can have a density of at least about 0.94 g/cm³, a HLMI ($I_{21}$) in a range from about 4 to about 25 g/10 min, a Mw in a range from about 200,000 to about 500,000 g/mol, and a ratio of Mw/Mn in a range from about 12 to about 40. Another illustrative and non-limiting example of a base resin (e.g., comprising an ethylene copolymer) of the present invention can have a density in a range from about 0.94 to about 0.96, a HLMI ($I_{21}$) in a range from about 6 to about 18 g/10 min, a Mw in a range from about 210,000 to about 400,000 g/mol, and a ratio of Mw/Mn in a range from about 18 to about 35. These illustrative and non-limiting examples of base resins consistent with the present invention also can have any of the polymer properties listed below and in any combination, unless indicated otherwise.

The densities of the base resin used to produce ethylene polymers disclosed herein often are greater than or equal to about 0.94 g/cm³, for example, greater than or equal to about 0.942 g/cm³, or greater than or equal to about 0.945 g/cm³. Yet, in particular aspects, the density can be in a range from about 0.94 to about 0.96 g/cm³, from about 0.94 to about 0.955 g/cm³, from about 0.94 to about 0.95 g/cm³, from about 0.945 to about 0.96 g/cm³, from about 0.942 to about 0.958 g/cm³, or from about 0.942 to about 0.952 g/cm³.

The base resin used to produce ethylene polymers in accordance with some aspects of this invention generally can have a high load melt index (HLMI, $I_{21}$) in a range from about 4 to about 25 g/10 min. For example, the base resin can have a HLMI in a range from about 5 to about 25, from about 5 to about 20, from about 6 to about 20, from about 7 to about 25, from about 7 to about 18, from about 8 to about 16, or from about 9 to about 15 g/10 min.

Additionally, the base resin can have a ratio of HLMI/$I_5$ of greater than about 15 and less than about 50. Suitable ranges for HLMI/$I_5$ can include, but are not limited to, from about 15 to about 45, from about 20 to about 50, from about 20 to about 45, from about 25 to about 45, from about 25 to about 40, or from about 29 to about 35, and the like.

Base resins consistent with various aspects of the present invention generally have a broad molecular weight distribution, and often with a weight-average molecular weight (Mw) in a range from about 200,000 to about 500,000 g/mol, from about 220,000 to about 500,000 g/mol, from about 210,000 to about 400,000 g/mol, from about 230,000 to about 380,000 g/mol, or from about 250,000 to about 360,000 g/mol, and the like. Likewise, suitable non-limiting ranges of the number-average molecular weight (Mn) can include from about 8,000 to about 20,000 g/mol, from about 9,000 to about 18,000 g/mol, or from about 10,000 to about 16,000 g/mol, and the like. Further, suitable ranges for the z-average molecular weight (Mz) can include, for instance, from about 1,000,000 to about 2,500,000, from about 1,000,000 to about 2,300,000, or from about 1,100,000 to about 2,200,000 g/mol, and the like.

The ratio of Mw/Mn, or the polydispersity index, for the base resins of this invention often can be greater than or equal to about 12 and less than or equal to about 40. Accordingly, suitable ranges for the ratio of Mw/Mn can include from about 12 to about 40, from about 13 to about 38, from about 14 to about 39, from about 16 to about 37, or from about 18 to about 35, and the like.

Base resins described herein can, in some aspects, have a reverse comonomer distribution, i.e., a short chain branch content that generally increases as molecular weight increases, for example, the higher molecular weight components of the polymer generally have higher comonomer incorporation than the lower molecular weight components. Typically, there is increasing comonomer incorporation with increasing molecular weight. For instance, the number of short chain branches (SCB) per 1000 total carbon atoms can be greater at Mw than at Mn. Additionally or alternatively, the number of short chain branches (SCB) per 1000 total carbon atoms can be greater at Mz than at Mn.

Consistent with aspects of this invention, the base resin (e.g., an ethylene/α-olefin copolymer) can comprise a high or higher molecular weight (HMW) component (or a first component) and a low or lower molecular weight (LMW) component (or a second component). These component terms are relative, are used in reference to each other, and are not limited to the actual molecular weights of the respective components. The molecular weight characteristics of these LMW and HMW components can be determined by deconvoluting the composite (overall polymer) molecular weight distribution (e.g., determined using gel permeation chromatography). The amount of the higher molecular weight component, based on the total polymer (the base resin), is not limited to any particular range. Generally, however, the amount of the higher molecular weight component can be in a range from about 35 to about 65 wt. %, from about 40 to about 60 wt. %, or from about 45 to about 55 wt. %.

The density of the higher molecular weight component of the base resin often is less than or equal to about 0.94 g/cm$^3$. For example, the higher molecular weight component can have a density in a range from about 0.915 to about 0.94, from about 0.92 to about 0.94, from about 0.92 to about 0.93, or from about 0.922 to about 0.932 g/cm$^3$.

The melt flow rate of the higher molecular weight component of the base resin can be quantified with a high load melt index: HLMI$_{275}$ (121 using a 2.75 mm diameter capillary). The HLMI$_{275}$ (121 using a 2.75 mm diameter capillary) of the higher molecular weight component generally ranges from about 0.2 to about 1, from about 0.3 to about 0.9, or from about 0.4 to about 0.8 g/10 min.

The molecular weight distribution of the higher molecular weight component of the base resin generally can be characterized as follows. The ratio of Mw/Mn of the higher molecular weight component can range from about 4 to about 8, from about 4 to about 7, from about 4.5 to about 6.5, or from about 5 to about 6. Suitable non-limiting ranges of the number-average molecular weight (Mn) for the higher molecular weight component can include from about 80,000 to about 120,000, or from about 90,000 to about 110,000 g/mol. Likewise, suitable non-limiting ranges of the weight-average molecular weight (Mw) for the higher molecular weight component can include from about 425,000 to about 650,000, or from about 500,000 to about 600,000 g/mol. Additionally, suitable non-limiting ranges of the z-average molecular weight (Mz) for the higher molecular weight component can include from about 1,500,000 to about 2,500,000, or from about 1,600,000 to about 2,000,000 g/mol.

The molecular weight distribution of the lower molecular weight component of the base resin generally can be characterized as follows. The ratio of Mw/Mn of the lower molecular weight component can range from about 4 to about 8, from about 4 to about 7, from about 4.5 to about 6.5, or from about 4.5 to about 6. Suitable non-limiting ranges of the Mn for the lower molecular weight component can include from about 4,000 to about 8,000, or from about 5,000 to about 7,000 g/mol. Likewise, suitable non-limiting ranges of the Mw for the lower molecular weight component can include from about 20,000 to about 40,000, or from about 25,000 to about 35,000 g/mol. Additionally, suitable non-limiting ranges of the Mz for the lower molecular weight component can include from about 50,000 to about 110,000, or from about 65,000 to about 95,000 g/mol.

Although one or more additives can be incorporated during the conversion of the base resin to the ethylene polymer, or during the conversion of the ethylene polymer to the pipe product (or to other article of manufacture), the base resin also can contain one or more suitable additives. Non-limiting examples of suitable additives can include an antioxidant, an acid scavenger, an antiblock additive, a slip additive, a colorant, a filler, a processing aid, a UV inhibitor, and the like. Combinations of two or more additives can be present in the base resin. Selections for these additives and typical addition amounts can be the same as those described above in relation to the ethylene polymer.

Consistent with aspects of the present invention, the base resin can be produced using a Ziegler-Natta catalyst system, and the catalyst system can be heterogeneous or homogeneous. The catalyst can have a titanium content in the 2-12 wt. % range, the 4-12 wt. % range, or the 6-10 wt. % range, and can contain titanium trichloride, titanium tetrachloride, magnesium chloride, or any combination thereof. In some aspects, the catalyst is a solid catalyst. Any suitable co-catalyst can be used, such as an alkyl aluminum co-catalyst.

Base resins can be produced from the disclosed catalyst systems using any suitable olefin polymerization process using various types of polymerization reactors, polymerization reactor systems, and polymerization reaction conditions. One such olefin polymerization process for polymerizing olefins in the presence of a catalyst composition of the present invention can comprise contacting the catalyst composition with an ethylene and optionally an olefin comonomer (one or more) in a polymerization reactor system under polymerization conditions to produce the base resin.

As used herein, a "polymerization reactor" includes any polymerization reactor capable of polymerizing olefin monomers and comonomers (one or more than one comonomer) to produce homopolymers, copolymers, terpolymers, and the like. The various types of polymerization reactors include those that can be referred to as a batch reactor, slurry reactor, gas-phase reactor, solution reactor, high pressure reactor, tubular reactor, autoclave reactor, and the like, or combinations thereof; or alternatively, the polymerization reactor system can comprise a slurry reactor, a gas-phase reactor, a solution reactor, or a combination thereof. The polymerization conditions for the various reactor types are well known to those of skill in the art. Gas phase reactors can comprise fluidized bed reactors or staged horizontal reactors. Slurry reactors can comprise vertical or horizontal loops. High pressure reactors can comprise autoclave or tubular reactors. Reactor types can include batch or continuous processes. Continuous processes can use intermittent or continuous product discharge. Polymerization reactor systems and processes also can include partial or full direct recycle of unreacted monomer, unreacted comonomer, and/or diluent.

A polymerization reactor system can comprise a single reactor or multiple reactors (2 reactors, more than 2 reactors, etc.) of the same or different type. For instance, the polymerization reactor system can comprise a slurry reactor, a gas-phase reactor, a solution reactor, or a combination of two or more of these reactors. Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop and/or gas phase reactors. The multiple reactors can be operated in series, in parallel, or both. Accordingly, the present invention encompasses polymerization reactor systems comprising a single reactor, comprising two reactors, and comprising more than two reactors. The polymerization reactor system can comprise a slurry reactor, a gas-phase reactor, a solution reactor, in certain aspects of this invention, as well as multi-reactor combinations thereof.

According to one aspect, the polymerization reactor system can comprise at least one loop slurry reactor comprising vertical or horizontal loops. Monomer, diluent, catalyst, and comonomer can be continuously fed to a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction, separation by cyclonic action in either a cyclone or hydrocyclone, or separation by centrifugation.

In an aspect of this invention, the base resin can be produced in a dual loop slurry reactor. For instance, the base resin can be produced in two loop reactors operating in series, using a Ziegler-Natta catalyst. Often, comonomer can be fed to the first reactor, and the high molecular weight component of the base resin can be produced in the first reactor, and the low molecular weight component of the base resin can be produced in the second reactor.

A typical slurry polymerization process (also known as the particle form process) is disclosed, for example, in U.S. Pat. Nos. 3,248,179, 4,501,885, 5,565,175, 5,575,979, 6,239,235, 6,262,191, 6,833,415, and 8,822,608, each of which is incorporated herein by reference in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used.

According to yet another aspect, the polymerization reactor system can comprise at least one gas phase reactor (e.g., a fluidized bed reactor). Such reactor systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. Representative gas phase reactors are disclosed in U.S. Pat. Nos. 5,352,749, 4,588,790, 5,436,304, 7,531,606, and 7,598,327, each of which is incorporated by reference in its entirety herein.

According to still another aspect, the polymerization reactor system can comprise a high pressure polymerization reactor, e.g., can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately to obtain optimal polymerization reaction conditions.

According to yet another aspect, the polymerization reactor system can comprise a solution polymerization reactor wherein the monomer/comonomer are contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone can be maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

The polymerization reactor system can further comprise any combination of at least one raw material feed system, at least one feed system for catalyst or catalyst components, and/or at least one polymer recovery system. Suitable reactor systems can further comprise systems for feedstock purification, catalyst storage and preparation, extrusion, reactor cooling, polymer recovery, fractionation, recycle, storage, loadout, laboratory analysis, and process control. Depending upon the desired properties of the olefin polymer, hydrogen can be added to the polymerization reactor as needed (e.g., continuously, pulsed, etc.).

Polymerization conditions that can be controlled for efficiency and to provide desired polymer properties can include temperature, pressure, and the concentrations of various reactants. Polymerization temperature can affect catalyst productivity, polymer molecular weight, and molecular weight distribution. Various polymerization conditions can be held substantially constant, for example, for the production of a particular grade of the olefin polymer (or ethylene polymer). A suitable polymerization temperature can be any temperature below the de-polymerization temperature according to the Gibbs Free energy equation. Typically, this includes from about 60° C. to about 280° C., for example, or from about 60° C. to about 120° C., depending upon the type of polymerization reactor(s). In some reactor systems, the polymerization temperature generally can be within a range from about 70° C. to about 100° C., or from about 75° C. to about 95° C.

Suitable pressures will also vary according to the reactor and polymerization type. The pressure for liquid phase polymerizations in a loop reactor is typically less than 1000 psig (6.9 MPa). Pressure for gas phase polymerization is usually at about 200 to 500 psig (1.4 MPa to 3.4 MPa). High pressure polymerization in tubular or autoclave reactors is generally run at about 20,000 to 75,000 psig (138 to 517 MPa). Polymerization reactors can also be operated in a supercritical region occurring at generally higher temperatures and pressures. Operation above the critical point of a pressure/temperature diagram (supercritical phase) can offer advantages to the polymerization reaction process.

Consistent with aspects of this invention, the olefin monomer used in the polymerization process can comprise ethylene, and the comonomer can comprise a $C_3$-$C_{10}$ alpha-olefin; alternatively, the comonomer can comprise 1-butene, 1-pentene, 1-hexene, 1-octene, 1-decene, styrene, or any combination thereof; alternatively, the comonomer can comprise 1-butene, 1-hexene, 1-octene, or any combination thereof; alternatively, the comonomer can comprise 1-butene; alternatively, the comonomer can comprise 1-hexene; or alternatively, the comonomer can comprise 1-octene.

EXAMPLES

The invention is further illustrated by the following examples, which are not to be construed in any way as imposing limitations to the scope of this invention. Various other aspects, embodiments, modifications, and equivalents thereof which, after reading the description herein, may suggest themselves to one of ordinary skill in the art without departing from the spirit of the present invention or the scope of the appended claims.

The high load melt index (HLMI, $I_{21}$, g/10 min) was determined in accordance with ASTM D1238 at 190° C. with a 21.6 kg weight, and the 15 melt index (g/10 min) was determined in accordance with ASTM D1238 at 190° C. with a 5 kg weight. $HLMI_{275}$ (121 using a 2.75 mm diameter capillary) was determined in accordance with ASTM D1238 at 190° C. with a 21.6 kg weight, but using a 2.75 mm diameter capillary. Density was determined in grams per cubic centimeter ($g/cm^3$) on a compression molded sample, cooled at 15° C. per hour, and conditioned for 40 hours at room temperature in accordance with ASTM D1505 and ASTM D4703.

Molecular weights and molecular weight distributions were obtained using a PL-GPC 220 (Polymer Labs, an Agilent Company) system equipped with a IR4 detector (Polymer Char, Spain) and three Styragel HMW-6E GPC columns (Waters, Mass.) running at 145° C. The flow rate of the mobile phase 1,2,4-trichlorobenzene (TCB) containing 0.5 g/L 2,6-di-t-butyl-4-methylphenol (BHT) was set at 1 mL/min, and polymer solution concentrations were in the range of 1.0-1.5 mg/mL, depending on the molecular weight. Sample preparation was conducted at 150° C. for nominally 4 hr with occasional and gentle agitation, before the solutions were transferred to sample vials for injection. An injection volume of about 200 μL was used. The integral calibration method was used to deduce molecular weights and molecular weight distributions using a broad Chevron Phillips Chemical Company's HDPE polyethylene resin, MARLEX BHB5003, as the standard. The integral table of the standard was predetermined in a separate experiment with SEC-MALS. Mn is the number-average molecular weight, Mw is the weight-average molecular weight, and Mz is the z-average molecular weight.

Melt rheological characterizations were performed as follows. Small-strain (10%) oscillatory shear measurements were performed on an Anton Paar MCR 501 rheometer using parallel-plate geometry. All rheological tests were performed at 190° C. The complex viscosity $|\eta^*|$ versus frequency (w) data were then curve fitted using the modified three parameter Carreau-Yasuda (CY) empirical model to obtain the zero shear viscosity—$\eta_0$, characteristic viscous relaxation time—$\tau_\eta$ and the breadth parameter—$\alpha$ (CY-a parameter). The simplified Carreau-Yasuda (CY) empirical model is as follows.

$$|\eta^*(\omega)| = \frac{\eta_0}{[1 + (\tau_\eta \omega)^a]^{(1-n)/a}},$$

wherein: $|\eta^*(\omega)|$=magnitude of complex shear viscosity;
$\eta_0$=zero shear viscosity;
$\tau_\eta$=viscous relaxation time (Tau($\eta$) in sec);
$\alpha$="breadth" parameter (CY-a parameter);
n=fixes the final power law slope, fixed at 2/11; and
ω=angular frequency of oscillatory shearing deformation.

Details of the significance and interpretation of the CY model and derived parameters can be found in: C. A. Hieber and H. H. Chiang, *Rheol. Acta*, 28, 321 (1989); C. A. Hieber and H. H. Chiang, *Polym. Eng. Sci.,* 32, 931 (1992); and R. B. Bird, R. C. Armstrong and O. Hasseger, *Dynamics of Polymeric Liquids, Volume* 1, *Fluid Mechanics,* 2nd Edition, John Wiley & Sons (1987); each of which is incorporated herein by reference in its entirety.

A creep adjustment was used to extend the low frequency range of rheological characterization to $10^{-4}$ $sec^{-1}$. In the creep test, a constant shear stress $\sigma_0$ was applied to the specimen and the shear strain γ was recorded as a function of creep time t. Although the time-dependent data generated by the creep and creep recovery tests look different from the frequency-dependent data measured in the dynamic frequency sweep test, as long as the measurements are performed in the linear viscoelastic regime, these two experimental data sets contain the same rheological information, so that the time-dependent creep compliance data can be transformed into the frequency-dependent dynamic data, and thus the long time creep measurement can supplement the low frequency data of the dynamic frequency sweep measurement. Details of the test method and analysis can be found in Y. W. Inn and D. C. Rohlfing, "Application of creep test to obtain the linear viscoelastic properties at low frequency range for polyethylene melts" *Applied Rheology* 22 (2012), incorporated herein by reference in its entirety.

The generalized Voigt model was used for modeling the time-dependent creep compliance $J(t)=\gamma(t)/\sigma_0$ in terms of a discrete spectrum $J_k$ of retardation times $\tau_k$ and zero shear rate viscosity $\eta_0$, $$J(t) = \sum_{k=1}^{N} J_k(1 - e^{-t/\tau_k}) + \frac{t}{\eta_0}.$$

If the discrete retardation spectrum accurately describes the compliance data, the theory of linear viscoelasticity permits a quantitative description of other types of experimental data, for example, the storage and the loss compliance calculated as $$J'(\omega) = \sum_{k=1}^{N} J_k \frac{1}{1 + \omega^2 \tau_k^2},$$

$$J''(\omega) = \frac{1}{\omega \eta_0} + \sum_{k=1}^{N} J_k \frac{\omega \tau_k}{1 + \omega^2 \tau_k^2}.$$

From the relationship between the complex modulus and the complex compliance, the storage and loss modulus of dynamic frequency sweep data can be obtained as $$G'(\omega) = \frac{J'(\omega)}{[J'(\omega)]^2 + [J''(\omega)]^2},$$

$$G''(\omega) = \frac{J''(\omega)}{[J'(\omega)]^2 + [J''(\omega)]^2}.$$

As a simple numerical approach to obtain the discrete spectrum of retardation times, the Microsoft Excel Solver tool can be used by minimizing the following objective function O.

$$O = \sum_{i=1}^{N} \frac{[J_{exp}(t_i) - J_{model}(t_i)]^2}{[J_{exp}(t_i)]^2}.$$

For reliable conversion of the time-dependent creep data into the frequency-dependent dynamic data, the frequency range needs to be limited by the testing time of the creep measurement. If it is possible to obtain precise experimental data over the entire range of creep time until the creep compliance reaches the steady state, the exact function of retardation spectra over the entire range of time scale also can be calculated. However, it is often not practical to obtain such data for high molecular weight polymers, which have very long relaxation times. The creep data only contain information within a limited range of time, so that the frequency range is limited by the duration time $t_N$ of the creep test, i.e., valid information for frequencies is in the range of $\omega > t_N^{-1}$, and the extrapolated data outside this frequency range can be influenced by artifacts of the fittings.

For the rheological measurements involving a creep adjustment, the polymer samples were compression molded at 182° C. for a total of 3 min. The samples were allowed to melt at a relatively low pressure for 1 min and then subjected to a high molding pressure for an additional 2 min. The molded samples were then quenched in a room temperature press, and then 25.4 mm diameter disks were stamped out of the molded slabs for the measurement in the rotational rheometer. The measurements were performed in parallel plates of 25 mm diameter at 190° C. using a controlled-stress rheometer equipped with an air bearing system (Physica MCR-501, Anton Paar). The test chamber of the rheometer was purged with nitrogen to minimize oxidative degradation. After thermal equilibration, the specimens were squeezed between the plates to a 1.6 mm thickness, and the excess was trimmed. A total of 8 min elapsed between the time the sample was inserted and the time the test was started. For the dynamic frequency sweep measurement, small-strain (1-10%) oscillatory shear in the linear viscoelastic regime was applied at angular frequencies from 0.0316 to 316 sec$^{-1}$. The creep test was performed for 10,200 sec (170 min) to limit the overall testing time within 4 hr, since sample throughput and thermal stability were concerns. By converting the time dependent creep data to frequency dependent dynamic data, the low frequency range was extended down to $10^{-4}$ rad/sec, two orders of magnitude lower than the frequency range of the dynamic test. The complex viscosity ($|\eta^*|$) versus frequency ($\omega$) data were curve fitted using the Carreau-Yasuda model.

One of the major concerns in performing the creep test, and indeed any long time scale measurement, was that the sample does not appreciably change during the measurement, which may take several hours to perform. If a polymer sample is heated for long time period without proper thermal stabilization (e.g., antioxidants), changes in the polymer can occur that can have a significant effect on the rheological behavior of the polymer and its characterization. Polymers which are being tested should have thermal stability for at least 4-5 hr at 190° C. under nitrogen; for example, ethylene polymers containing at least 0.4 wt. % of antioxidants were found to be stable enough to obtain valid creep adjustment data.

For the rheological measurement in the parallel plates, the specimen was squeezed between the plates to a 1.6 mm thickness, and then the excess was trimmed. When the sample was trimmed with large forces on one direction, some residual stress was generated to cause the strain to drift. Therefore, performing the creep test right after sample trimming should be avoided, because the residual stress can affect the subsequent creep measurement, particularly for the highly viscoelastic resins having long relaxation times. If the applied stress of the creep test is not large enough, the resulting strain can be so small that the creep results can be influenced by the artifact of the strain drifting. In order to minimize this effect, samples were trimmed as gently as possible, and the creep test was conducted after 2000 sec of waiting time, in order to allow relaxation of any residual stress.

The appropriate magnitude of applied stress $\sigma_0$ is important for reliable creep data. The stress $\sigma_0$ must be sufficiently small such that the strain will stay within the linear viscoelastic regime, and it must be sufficiently large such that the strain signal is strong enough to provide satisfactory resolution of data for good precision. Although not limited thereto, a suitable applied stress was equal to the complex modulus |G*| at a frequency of 0.01 rad/sec multiplied by 0.04.

Polymer viscosities at 0.01 sec$^{-1}$ (referred to as $\eta$ (0.01)) and 0.001 sec$^{-1}$ (referred to as $\eta$ (0.001)) at 190° C. were determined with the Anton Paar MCR 501 rheometer using parallel-plate geometry.

The long chain branches (LCB's) per 1,000,000 total carbon atoms were calculated using the method of Janzen and Colby (*J. Mol. Struct.*, 485/486, 569-584 (1999)), from values of zero shear viscosity, $\eta_0$ (determined from the Carreau-Yasuda model with creep adjustment, described hereinabove), and measured values of Mw (determined as described above). See also U.S. Pat. No. 8,114,946; J. Phys. Chem. 1980, 84, 649; and Y. Yu, D. C. Rohlfing, G. R Hawley, and P. J. DesLauriers, *Polymer Preprints*, 44, 49-50 (2003). These references are incorporated herein by reference in their entirety.

Short chain branch (SCB) content and short chain branching distribution (SCBD) across the molecular weight distribution can be determined via an IR5-detected GPC system (IR5-GPC), wherein the GPC system was a PL220 GPC/SEC system (Polymer Labs, an Agilent company) equipped with three Styragel HMW-6E columns (Waters, Mass.) for polymer separation. A thermoelectric-cooled IR5 MCT detector (IR5) (Polymer Char, Spain) is connected to the GPC columns via a hot-transfer line. Chromatographic data are obtained from two output ports of the IR5 detector. First, the analog signal goes from the analog output port to a digitizer before connecting to Computer "A" for molecular weight determinations via the Cirrus software (Polymer Labs, now an Agilent Company) and the integral calibration method using a broad HDPE MARLEX BHB5003 resin (Chevron Phillips Chemical) as the broad molecular weight standard. The digital signals, on the other hand, go via a USB cable directly to Computer "B" where they are collected by a LabView data collection software provided by Polymer Char. Chromatographic conditions are set as follows: column oven temperature of 145° C.; flowrate of 1 mL/min; injection volume of 0.4 mL; and polymer concentration of about 2 mg/mL, depending on sample molecular weight. The temperatures for both the hot-transfer line and IR5 detector sample cell are set at 150° C., while the temperature of the electronics of the IR5 detector is set at 60° C. Short chain branching content is determined via an in-house method using the intensity ratio of CH$_3$ ($I_{CH3}$) to CH$_2$ ($I_{CH2}$) coupled with a calibration curve. The calibration curve is a plot of SCB content ($x_{SCB}$) as a function of the intensity ratio of $I_{CH3}/I_{CH2}$. To obtain a calibration curve, a group of polyethylene resins (no less than 5) of SCB level ranging from zero to ca. 32 SCB/1,000 total carbons (SCB Standards) is used. All these SCB Standards have known SCB levels and flat SCBD profiles predetermined separately by NMR and the solvent-gradient fractionation coupled with NMR (SGF-NMR) methods. Using SCB calibration curves thus established, profiles of short chain branching distribution across the molecular weight distribution are obtained for resins fractionated by the IR5-GPC system under exactly the same chromatographic conditions as for these SCB standards. A relationship between the intensity ratio and the elution volume is converted into SCB distribution as a function of MWD using a predetermined SCB calibration curve (i.e., intensity ratio of $I_{CH3}/I_{CH2}$ vs. SCB content) and MW calibration curve (i.e., molecular weight vs. elution time) to convert the intensity ratio of $I_{CH3}/I_{CH2}$ and the elution time into SCB content and the molecular weight, respectively. Although not tested, it was expected that the number of short chain branches (SCB) per 1000 total carbon atoms of the ethylene polymer (or the base resin) at Mw (or Mz) is greater than at Mn.

The oxidative induction temperature (OIT) was determined in accordance with ASTM D3895. While not tested, it was expected that the percent elongation at break and yield strength of the ethylene polymers and pipes would be at least 500% and at least 3000 psi, respectively, when determined in accordance with ASTM D638. While not tested, it was also expected that the Charpy ductile to brittle transition temperature for the ethylene polymers and pipes would be below –10° C., when determined in accordance with ASTM F2231.

Examples A-D

Table I summarizes the properties of the black pipe of Example A, and the natural (no colorant) ethylene polymers of Examples B-C. Table II summarizes the properties of the base resin that was used to produce the ethylene polymer of Example B (the base resins for Example A and C had similar properties to that of the base resin of Example B).

The base resin for Polymer B was produced in a 30-gallon dual loop reactor system in which the first loop slurry reactor was operated at a polymerization temperature of 87° C., a pressure of 570 psig, and isobutane, 1-hexene, and ethylene feeds rates of 60 lb/hr, 1.4 lb/hr, and 31 lb/hr, respectively. Hydrogen concentration was 0.05 mol % based on reactor contents, and triethylaluminum concentration was 67 ppm by weight of isobutane. The catalyst was a solid titanium-containing Ziegler-Natta catalyst, and it was fed to the first reactor at a rate of 0.002-0.0035 lb/hr. The HMW component of the base resin was produced in the first loop slurry reactor, and constituted approximately 50 wt. % of the overall base resin.

The second loop slurry reactor was operated at a polymerization temperature of 94° C., a pressure of 575 psig, and isobutane and ethylene feeds rates of 50 lb/hr and 37 lb/hr, respectively. Hydrogen concentration was 1 mol % based on reactor contents, and triethylaluminum concentration was 55 ppm by weight of isobutane. The LMW component of the base resin was produced in the second loop slurry reactor, and constituted approximately 50 wt. % of the overall base resin.

Certain polymer properties of the base resin of Example B are summarized in Table II. The respective LMW and HMW component properties in Table II were determined by deconvoluting the molecular weight distribution of a base resin having similar properties to the base resins of Examples A-C. The relative amounts of the LMW and HMW components (weight percentages) in the polymer can be determined using a commercial software program (Systat Software, Inc., PEAK FIT v. 4.05). The other molecular weight parameters for the LMW and HMW components (e.g., Mn, Mw, and Mz of each component) were determined by using the deconvoluted data from the PEAK FIT program, and applying a Schulz-Flory distribution mathematical function and a Gaussian peak fit, as generally described in U.S. Pat. No. 7,300,983, which is incorporated herein by reference in its entirety. As shown in Table II, the wt. % of the HMW component was 50 wt. %, the Mw of the HMW component was 520,000 g/mol, the Mw/Mn of the HMW component was 5.3, the Mw of the LMW component was 29,300 g/mol, and the Mw/Mn of the LMW component was 5.

The ethylene polymers of Examples A-C were prepared by blending the respective base resins of Examples A-C with a masterbatch containing a polymer carrier resin and 2,5-dimethyl-2,5-di(t-butylperoxy)hexane. The amount of peroxide groups was 125 ppm by weight of peroxide groups, based on the weight of the base resin. The blend of the base resin and peroxide masterbatch was compounded using a Kobe mixer (Example B) or a twin screw extrusion system (ZSK-300, for Examples A and C), and then pelletized to form the ethylene polymers of Examples A-C. The properties of the polymers of Examples B-C are listed in Table I. For Examples B-C, the density was 0.948-0.949 g/cm$^3$, the HLMI ($I_{21}$) was 6.8-7.3 g/10 min, the zero-shear viscosity ($\eta_0$) at 190° C. was 100,000-210,000 kPa-sec, the relaxation time was 1700-1900 sec, the CY-a parameter was 0.12-0.16, the number of LCB per million total carbon atoms was 8-14, the $\eta$ (0.01) was 520-530 kPa-sec, the $\eta$ (0.001) was 1500-1900 kPa-sec, and the average number of LCB per Mw (vf) was 0.21-0.31.

The ethylene polymers of Examples A-C also contained 2000 ppm of IRGANOX 1010, 2000 ppm of IRGAFOS 168, 400 ppm of calcium stearate, and 400 ppm of a polymer processing aid. These additives were added to the base resin along with the peroxide masterbatch.

The ethylene polymer of Example A was subsequently mixed with 2-3 wt. % carbon black additive and extruded at a production rate of greater than 2,000 lb/hr on a 120 mm grooved feed single screw extruder with a basket design pipe die to produce a black pipe at a wall thickness of approximately 3.3 inches and an outer diameter of 24 inches. The polymer properties of the black pipe of Example A is listed in Table I, and these properties are generally consistent with those of the ethylene polymers of Examples B-C.

Figure 1:
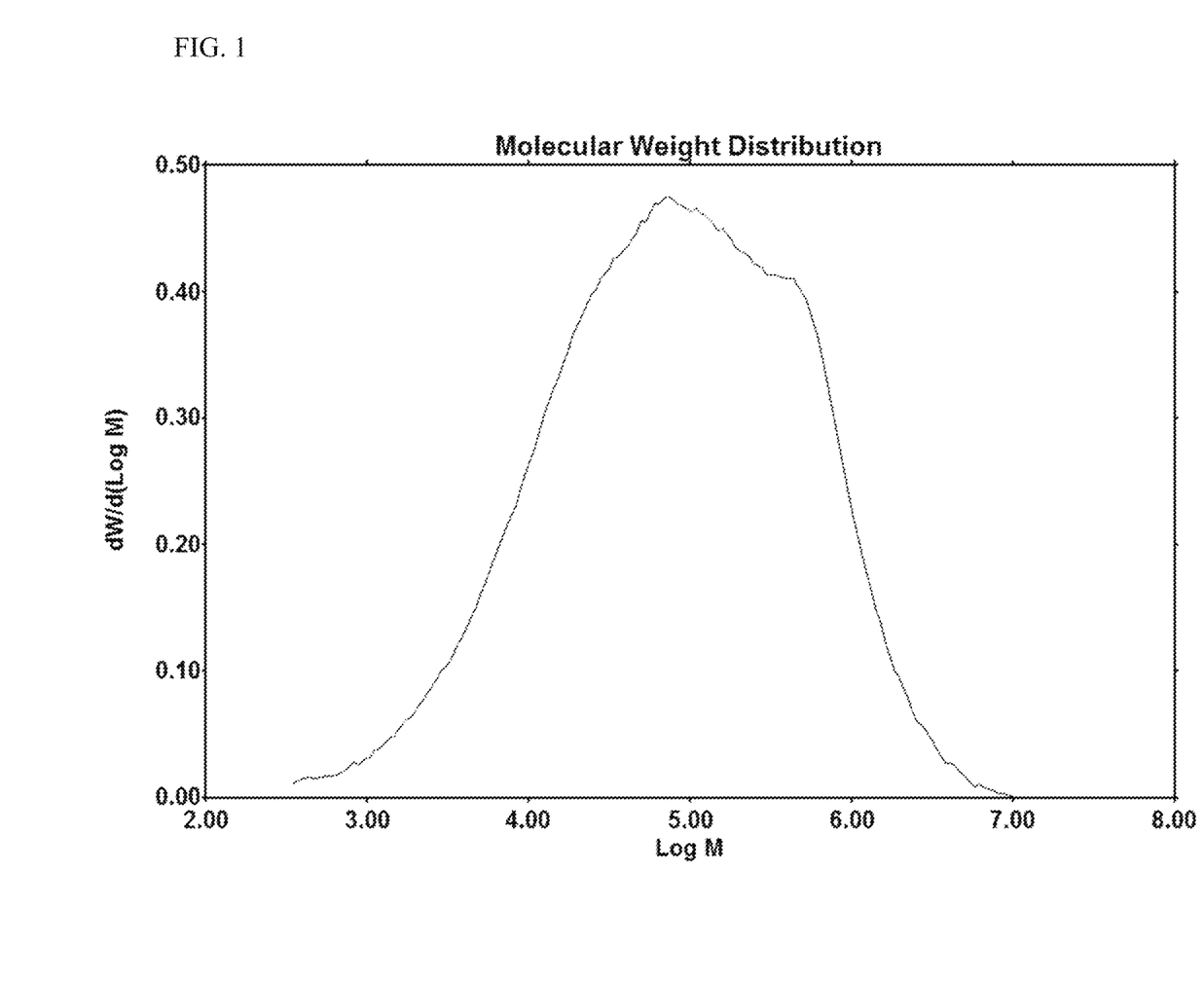
FIG. 1 presents a plot of the molecular weight distribution of the ethylene polymer of Example C.
Figure 2:
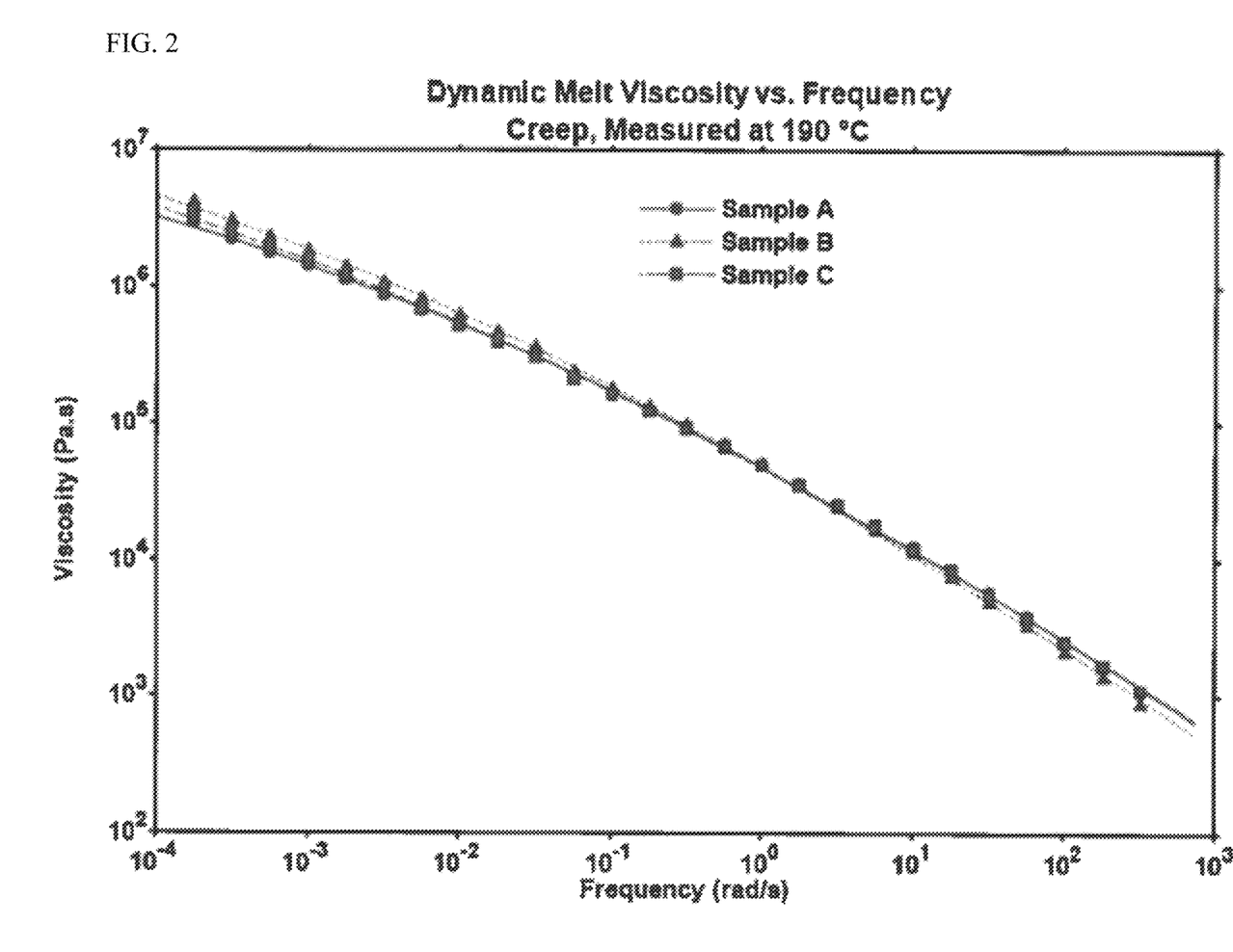
FIG. 2 presents a dynamic rheology plot (viscosity versus shear rate) at 190° C. for the pipe of Example A and the ethylene polymers of Examples B-C.

The molecular weight distribution curve for the ethylene polymer of Example C is illustrated in FIG. 1, and the rheology curves (viscosity versus shear rate) for the ethylene polymers of Examples A-C are shown in FIG. 2, including shear rates down to 10$^{-4}$ sec$^{-1}$. Of particular interest is the very high viscosity are low shear rates.

Pipe failure times of at least 1200 hr, at least 3400 hr, or at least 7400 hr, under chlorinated water conditions at 90° C. and 450 psi, were determined in accordance with ASTM F2263-07e1. A pipe was made from the ethylene polymer of Example A in a manner similar to the black pipe of Example A, but at a 4-inch diameter. This 4-inch black pipe has a failure time of at least 6800 hr (still in testing); the additive package comprised 2000 ppm of phenolic antioxidant, 2000 ppm of phosphite antioxidant, 400 ppm of acid scavenger, and 400 ppm of processing aid.

Pipes were also made from ethylene polymers similar to Examples B-C, and these 4-inch pipes have a failure time of at least 3400 hr (still in testing); the additive package comprised 3500 ppm of phenolic antioxidant, 750 ppm of phosphite antioxidant, and 400 ppm of processing aid.

Hydrostatic strengths at 23° C. or 60° C. after 100,000 hr were determined in accordance with ASTM D1598 and ASTM D2837. The pipes produced as described herein (pressure tested in accordance with ASTM D1598 and analyzed in accordance with ASTM D2837) had a hydrostatic strength of 1600 psi at 23° C. for 100,000 hr, and a hydrostatic strength of 1000 psi at 60° C. for 100,000 hr.

Table III summarizes certain properties of the black pipe of Example A, the natural (no colorant) ethylene polymers of Examples B-C, and the black pipe of Example D (produced in a similar manner to the black pipe of Example A). Also included in Table III are comparative Examples 1-3, which are commercially-available low slump pipe resins (black pigmented). As shown in Table III, the relaxation time, $\eta$ (0.01), and 11 (0.001) of Examples A-D were significantly higher than the respective properties of comparative Examples 1-3.

Slump or sag during extrusion of large diameter, thick wall pipe depends on the melt strength of the resin. Besides rheology parameters (e.g., Table III), another way to characterize the melt strength is by extruding a parison from a blow molding machine, and measuring the time that it takes for the parison to break under its own weight. Measurements were performed on a Kautex KB-25 accumulator head blow molder with a 3.15" grooved feed single screw extruder to convey and push the melt through the die into the mold, 32" wide and 30.315" long. Under the same set of processing conditions of die gap and melt temperature, it took much longer for the parison extruded from ethylene polymers of this invention to break off under its own weight (parison sag time) than comparative polymers. Comparative Examples 2-3 had parison sag times (before break) of approximately 25 seconds, whereas polymers similar to Example C and to the polymer used to make the black pipe of Example A had parison sag times (before break) of approximately 50 seconds. Surprisingly, the parison sag times for ethylene polymers of this invention were twice that of comparative low slump pipe resins.

TABLE I

Examples A-C-Pipe and ethylene polymer properties

| Example | A | B | C |
|---|---|---|---|
| Density (g/cc) | — | 0.949 | 0.948 |
| HLMI (g/10 min) | — | 6.8-7.3 | 7.1 |
| I$_5$ (g/10 min) | — | — | 0.25 |
| $\eta_0$ (kPa-sec) | 55,200 | 101,000 | 206,000 |
| $\tau_\eta$ (sec) | 522 | 1840 | 1720 |
| CY-a | 0.145 | 0.152 | 0.122 |
| LCB (per million) | 14 | 8 | 14 |
| LCB/Mw (vf) | 0.27 | 0.21 | 0.31 |
| $\eta$ (0.01) (kPa-sec) | 527 | 527 | 525 |
| $\eta$ (0.001) (kPa-sec) | 1410 | 1820 | 1530 |
| Mw (kg/mol) | 259 | 358 | 289 |
| Mw/Mn | 21 | 35 | 18 |
| OIT (° C.) | — | — | 247 |

TABLE II

Example B-Base resin properties (reactor fluff)

| Example | B |
|---|---|
| Density (g/cc) | 0.9464 |
| HLMI (g/10 min) | 12.61 |
| Ratio of HLMI/I$_5$ | 31 |
| Mn (kg/mol) | 9 |
| Mw (kg/mol) | 345 |
| Mz (kg/mol) | 2303 |
| Mw/Mn | 38 |
| Mz/Mw | 6.7 |
| High Molecular Weight (HMW) Component | |
| Wt. % | 50 |
| HLMI$_{275}$ (g/10 min) | 0.57 |
| Density (g/cc) | 0.928 |
| Mn (kg/mol) | 98 |
| Mw (kg/mol) | 520 |
| Mz (kg/mol) | 1784 |

TABLE II-continued

Example B-Base resin properties (reactor fluff)

| Example | B |
|---|---|
| Mw/Mn | 5.3 |
| Mz/Mw | 3.4 |
| Low Molecular Weight (LMW) Component | |
| Mn (kg/mol) | 5.8 |
| Mw (kg/mol) | 29.3 |
| Mz (kg/mol) | 78.2 |
| Mw/Mn | 5.0 |
| Mz/Mw | 2.7 |

TABLE III

Examples A-D and Comparative Examples 1-3 - Pipe and ethylene polymer properties

| Example | A | B | C | D | 1 | 2 | 3 |
|---|---|---|---|---|---|---|---|
| $\eta_0$ (kPa-sec) | 55,200 | 101,000 | 206,000 | 33,800 | 1,500 | 51,500 | 40,500 |
| $\tau_\eta$ (sec) | 522 | 1840 | 1720 | 333 | 11 | 200 | 166 |
| CY-a | 0.145 | 0.152 | 0.122 | 0.157 | 0.233 | 0.120 | 0.124 |
| $\eta$ (0.01) (kPa-sec) | 527 | 527 | 525 | 529 | 288 | 334 | 330 |
| $\eta$ (0.001) (kPa-sec) | 1410 | 1820 | 1530 | 1380 | 520 | 830 | 820 |

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. An ethylene polymer having (or characterized by):

a density of at least about 0.94 g/cm$^3$;

a HLMI ($I_{21}$) in a range from about 4 to about 20 g/10 min;

a zero-shear viscosity ($\eta_0$) at 190° C. in a range from about 20,000 to about 400,000 kPa-sec; and a relaxation time ($\tau_\eta$) at 190° C. in a range from about 225 to about 3000 sec.

Aspect 2. The polymer defined in aspect 1, wherein the ethylene polymer has a density in any range disclosed herein, e.g., from about 0.94 to about 0.96, from about 0.94 to about 0.955, from about 0.945 to about 0.96, from about 0.942 to about 0.952, from about 0.94 to about 0.95 g/cm$^3$, etc.

Aspect 3. The polymer defined in aspect 1 or 2, wherein the ethylene polymer has a HLMI ($I_{21}$) in any range disclosed herein, e.g., from about 4 to about 18, from about 5 to about 15, from about 6 to about 16, from about 6 to about 14 g/10 min, etc.

Aspect 4. The polymer defined in any one of aspects 1-3, wherein the ethylene polymer has a zero-shear viscosity ($\eta_0$) at 190° C. in any range disclosed herein, e.g., from about 30,000 to about 300,000, from about 30,000 to about 275,000, from about 20,000 to about 250,000, from about 25,000 to about 250,000, from about 25,000 to about 230,000, from about 30,000 to about 215,000 kPa-sec, etc.

Aspect 5. The polymer defined in any one of aspects 1-4, wherein the ethylene polymer has a relaxation time in any range disclosed herein, e.g., from about 250 to about 2500 sec, from about 275 to about 2000 sec, from about 300 to about 2500 sec, from about 300 to about 2000 sec, etc.

Aspect 6. The polymer defined in any one of aspects 1-5, wherein the ethylene polymer has a CY-a parameter at 190° C. in any range disclosed herein, e.g., from about 0.06 to about 0.25, from about 0.09 to about 0.2, from about 0.1 to about 0.18, from about 0.1 to about 0.16, from about 0.12 to about 0.15, etc.

Aspect 7. The polymer defined in any one of aspects 1-6, wherein the ethylene polymer has a number of long chain branches (LCB) per million total carbon atoms in any range disclosed herein, e.g., from about 5 to about 50, from about 5 to about 35, from about 5 to about 32, from about 6 to about 28, from about 6 to about 26, from about 7 to about 20 LCB, etc.

Aspect 8. The polymer defined in any one of aspects 1-7, wherein the ethylene polymer has a viscosity at 0.01 sec$^{-1}$ {$\eta$ (0.01)} at 190° C. in any range disclosed herein, e.g., from about 300 to about 800, from about 400 to about 700, from about 450 to about 750, from about 500 to about 750, from about 500 to about 650 kPa-sec, etc.

Aspect 9. The polymer defined in any one of aspects 1-8, wherein the ethylene polymer has a viscosity at 0.001 sec$^{-1}$ {$\eta$ (0.001)} at 190° C. in any range disclosed herein, e.g., from about 800 to about 3000, from about 900 to about 2800, from about 1000 to about 2600, from about 1000 to about 2300, from about 1200 to about 2100, from about 1300 to about 1900 kPa-sec, etc.

Aspect 10. The polymer defined in any one of aspects 1-9, wherein the ethylene polymer has a reverse comonomer distribution, e.g., the number of short chain branches (SCB) per 1000 total carbon atoms of the polymer at Mw (or Mz) is greater than at Mn.

Aspect 11. The polymer defined in any one of aspects 1-10, wherein the ethylene polymer has a 15 in any range disclosed herein, e.g., from about 0.02 to about 0.3, from about 0.03 to about 0.25, from about 0.05 to about 0.18, from about 0.06 to about 0.15 g/10 min, etc.

Aspect 12. The polymer defined in any one of aspects 1-11, wherein the ethylene polymer has an average number of LCB per Mw (vf) in any range disclosed herein, e.g., from about 0.15 to about 0.51, from about 0.16 to about 0.43, from about 0.18 to about 0.37, etc.

Aspect 13. The polymer defined in any one of aspects 1-12, wherein the ethylene polymer has a ratio of Mw/Mn in any range disclosed herein, e.g., from about 13 to about 38, from about 14 to about 39, from about 16 to about 37, from about 18 to about 35, etc., and/or a Mw in any range disclosed herein, e.g., from about 220,000 to about 500,000, from about 210,000 to about 400,000, from about 230,000 to about 380,000, from about 250,000 to about 360,000 g/mol, etc.

Aspect 14. The polymer defined in any one of aspects 1-13, wherein the ethylene polymer comprises an ethylene/α-olefin copolymer.

Aspect 15. The polymer defined in any one of aspects 1-13, wherein the ethylene polymer comprises an ethylene homopolymer, an ethylene/1-butene copolymer, an ethylene/1-hexene copolymer, an ethylene/1-octene copolymer, or a combination thereof.

Aspect 16. The polymer defined in any one of aspects 1-15, wherein the ethylene polymer further comprises at least one additive selected from an antioxidant, an acid scavenger, an antiblock additive, a slip additive, a colorant, a filler, a processing aid, a UV inhibitor, etc., or any combination thereof.

Aspect 17. The polymer defined in any one of aspects 1-16, wherein the ethylene polymer further comprises an amount of carbon black in any range disclosed herein, e.g., from about 0.5 to about 5 wt. %, from about 1 to about 4 wt. %, from about 2 to about 3 wt. %, etc.

Aspect 18. The polymer defined in any one of aspects 1-17, wherein the ethylene polymer is further characterized by less than 300 gels/ft$^2$, for gels of at least 200 microns, when extruded at a specific energy of less than 0.25 kW-hr/kg.

Aspect 19. The polymer defined in any one of aspects 1-18, wherein the ethylene polymer is capable of producing a pipe having at least a 24-inch diameter and at least a 2-inch wall thickness.

Aspect 20. The polymer defined in any one of aspects 1-19, wherein the ethylene polymer is further characterized by a percent elongation at break in any range disclosed herein, e.g., from about 450 to about 850%, from about 500 to about 800%, from about 550 to about 750%, etc.

Aspect 21. The polymer defined in any one of aspects 1-20, wherein the ethylene polymer is further characterized by a yield strength in any range disclosed herein, e.g., from about 3000 to about 5000 psi, from about 3500 to about 4500 psi, from about 3500 to about 4000 psi, etc.

Aspect 22. The polymer defined in any one of aspects 1-21, wherein the ethylene polymer is further characterized by an oxidative induction temperature (OIT) in any range disclosed herein, e.g., at least about 200° C., at least about 220° C., at least about 240° C., etc.

Aspect 23. The polymer defined in any one of aspects 1-22, wherein the ethylene polymer is further characterized by a Charpy ductile to brittle transition temperature in any range disclosed herein, e.g., from about −35 to about −5° C., from about −30 to about −10° C., etc.

Aspect 24. An article of manufacture comprising the ethylene polymer defined in any one of aspects 1-23.

Aspect 25. A pipe comprising the ethylene polymer defined in any one of aspects 1-23.

Aspect 26. A pipe comprising the ethylene polymer defined in any one of aspects 1-23 and an amount of carbon black in any range disclosed herein, e.g., from about 0.5 to about 5 wt. %, from about 1 to about 4 wt. %, from about 2 to about 3 wt. %, etc.

Aspect 27. The pipe defined in aspect 25 or 26, wherein the pipe has the polymer properties defined in any one of aspects 1-23.

Aspect 28. The pipe defined in any one of aspects 25-27, wherein the pipe has a diameter of at least 24 inches and a wall thickness of at least 2 inches.

Aspect 29. The pipe defined in any one of aspects 25-28, wherein the pipe has a hydrostatic strength of 1600 psi at 23° C. for 100,000 hr and/or a hydrostatic strength of 1000 psi at 60° C. for 100,000 hr, in accordance with ASTM D1598 and ASTM D2837.

Aspect 30. A base resin having (or characterized by):
a density of at least about 0.94 g/cm$^3$;
a HLMI ($I_{21}$) in a range from about 4 to about 25 g/10 min;
a Mw in a range from about 200,000 to about 500,000 g/mol; and
a ratio of Mw/Mn in a range from about 12 to about 40.

Aspect 31. The base resin defined in aspect 30, wherein the base resin has a density in any range disclosed herein, e.g., from about 0.94 to about 0.955, from about 0.945 to about 0.96, from about 0.942 to about 0.952, from about 0.94 to about 0.95 g/cm$^3$, etc.

Aspect 32. The base resin defined in aspect 30 or 31, wherein the base resin has a ratio of Mw/Mn in any range disclosed herein, e.g., from about 13 to about 38, from about 14 to about 39, from about 16 to about 37, from about 18 to about 35, etc.

Aspect 33. The base resin defined in any one of aspects 30-32, wherein the base resin has a Mw in any range disclosed herein, e.g., from about 220,000 to about 500,000, from about 210,000 to about 400,000, from about 230,000 to about 380,000, from about 250,000 to about 360,000 g/mol, etc.

Aspect 34. The base resin defined in any one of aspects 30-33, wherein the base resin has a Mn in any range disclosed herein, e.g., from about 8,000 to about 20,000, from about 9,000 to about 8,000, from about 10,000 to about 16,000 g/mol, etc.

Aspect 35. The base resin defined in any one of aspects 30-34, wherein the base resin has a Mz in any range disclosed herein, e.g., from about 1,000,000 to about 2,500,000, from about 1,000,000 to about 2,300,000, from about 1,100,000 to about 2,200,000 g/mol, etc.

Aspect 36. The base resin defined in any one of aspects 30-35, wherein the base resin has a reverse comonomer distribution, e.g., the number of short chain branches (SCB) per 1000 total carbon atoms of the polymer at Mw (or Mz) is greater than at Mn.

Aspect 37. The base resin defined in any one of aspects 30-36, wherein the base resin has a HLMI ($I_{21}$) in any range disclosed herein, e.g., from about 6 to about 20, from about 7 to about 18, from about 8 to about 16 g/10 min, etc.

Aspect 38. The base resin defined in any one of aspects 30-37, wherein the base resin has a ratio of HLMI/$I_5$ in any range disclosed herein, e.g., from about 20 to about 45, from about 25 to about 40, from about 29 to about 35, etc.

Aspect 39. The base resin defined in any one of aspects 30-38, wherein the base resin comprises an ethylene/α-olefin copolymer.

Aspect 40. The base resin defined in any one of aspects 30-38, wherein the base resin comprises an ethylene homopolymer, an ethylene/1-butene copolymer, an ethylene/1-hexene copolymer, an ethylene/1-octene copolymer, or a combination thereof.

Aspect 41. The base resin defined in any one of aspects 30-38, wherein the base resin comprises an ethylene/1-hexene copolymer.

Aspect 42. The base resin defined in any one of aspects 30-41, wherein the base resin further comprises at least one additive selected from an antioxidant, an acid scavenger, an antiblock additive, a slip additive, a colorant, a filler, a processing aid, a UV inhibitor, etc., or any combination thereof.

Aspect 43. The base resin defined in any one of aspects 30-42, wherein the base resin comprises a higher molecular weight component and a lower molecular weight component.

Aspect 44. The base resin defined in aspect 43, wherein an amount of the higher molecular weight component, based on the total polymer, is in any range of weight percentages disclosed herein, e.g., from about 35 to about 65 wt. %, from about 40 to about 60 wt. %, from about 45 to about 55 wt. %, etc.

Aspect 45. The base resin defined in any one of aspects 43-44, wherein the higher molecular weight component has a $HLMI_{275}$ (121 using a 2.75 mm diameter capillary) in any range disclosed herein, e.g., from about 0.2 to about 1, from about 0.3 to about 0.9, from about 0.4 to about 0.8 g/10 min, etc.

Aspect 46. The base resin defined in any one of aspects 43-45, wherein the higher molecular weight component has a density in any range disclosed herein, e.g., from about 0.915 to about 0.94, from about 0.92 to about 0.94, from about 0.92 to about 0.93, from about 0.922 to about 0.932 g/cm$^3$, etc.

Aspect 47. The base resin defined in any one of aspects 43-46, wherein the higher molecular weight component has a ratio of Mw/Mn in any range disclosed herein, e.g., from about 4 to about 8, from about 4 to about 7, from about 4.5 to about 6.5, from about 5 to about 6, etc.

Aspect 48. The base resin defined in any one of aspects 43-47, wherein the higher molecular weight component has a Mn in any range disclosed herein, e.g., from about 80,000 to about 120,000, from about 90,000 to about 110,000 g/mol, etc.

Aspect 49. The base resin defined in any one of aspects 43-48, wherein the higher molecular weight component has a Mw in any range disclosed herein, e.g., from about 425,000 to about 650,000, from about 500,000 to about 600,000 g/mol, etc.

Aspect 50. The base resin defined in any one of aspects 43-49, wherein the higher molecular weight component has a Mz in any range disclosed herein, e.g., from about 1,500,000 to about 2,500,000, from about 1,600,000 to about 2,000,000 g/mol, etc.

Aspect 51. The base resin defined in any one of aspects 43-50, wherein the lower molecular weight component has a ratio of Mw/Mn in any range disclosed herein, e.g., from about 4 to about 8, from about 4 to about 7, from about 4.5 to about 6.5, from about 4.5 to about 6, etc.

Aspect 52. The base resin defined in any one of aspects 43-51, wherein the lower molecular weight component has a Mn in any range disclosed herein, e.g., from about 4,000 to about 8,000, from about 5,000 to about 7,000 g/mol, etc.

Aspect 53. The base resin defined in any one of aspects 43-52, wherein the lower molecular weight component has a Mw in any range disclosed herein, e.g., from about 20,000 to about 40,000, from about 25,000 to about 35,000 g/mol, etc.

Aspect 54. The base resin defined in any one of aspects 43-53, wherein the lower molecular weight component has a Mz in any range disclosed herein, e.g., from about 50,000 to about 110,000, from about 65,000 to about 95,000 g/mol, etc.

Aspect 55. The base resin defined in any one of aspects 30-54, wherein the base resin is produced using a Ziegler-Natta catalyst system.

Aspect 56. The base resin defined in any one of aspects 30-55, wherein the base resin is produced in any reactor disclosed herein, e.g., a slurry reactor, a gas-phase reactor, a solution reactor, a multi-zone circulating reactor (a single reactor with at least two reaction zones, with different reaction conditions in each reaction zone), etc., as well as multi-reactor combinations thereof.

Aspect 57. The base resin defined in any one of aspects 30-56, wherein the base resin is produced in a dual loop slurry reactor.

Aspect 58. A process for preparing an ethylene polymer, the process comprising contacting the base resin defined in any one of aspects 30-57 with a peroxide compound to produce the ethylene polymer defined in any one of aspects 1-23.

Aspect 59. The process defined in aspect 58, wherein the contacting step is conducted at a temperature sufficient to generate peroxide groups at about 60 to about 200 ppm, from about 75 to about 175 ppm, from about 100 to about 150 ppm, etc., of peroxide groups, based on the weight of the base resin.

Aspect 60. The process defined in aspect 58 or 59, wherein the contacting step comprises melt processing a blend (or mixture) of the base resin and the peroxide compound at any melt processing temperature disclosed herein, e.g., in a range from about 120 to about 300° C., in a range from about 150 to about 250° C., in a range from about 175 to about 225° C., etc.

Aspect 61. The process defined in aspect 60, wherein the melt processing is performed in a twin screw extrusion system.

Aspect 62. The process defined in aspect 60, wherein the melt processing is performed in a single screw extrusion system.

Aspect 63. The process defined in any one of aspects 58-62, wherein the peroxide compound comprises any suitable peroxide compound, or any peroxide compound disclosed herein, e.g., 2,5-dimethyl-2,5-di(t-butylperoxy)hexane, dicumyl peroxide, t-butyl cumyl peroxide, n-butyl-4,4'-di(t-butylperoxy)valerate, etc., or any combination thereof.

Aspect 64. A method of making a pipe comprising an ethylene polymer, the method comprising melt processing the ethylene polymer defined in any one of aspects 1-23 through a pipe die to form the pipe.

Aspect 65. The method defined in aspect 64, wherein the method comprises melt processing the ethylene polymer and at least one additive through the die.

Aspect 66. The method defined in aspect 65, wherein the additive comprises an antioxidant, an acid scavenger, an antiblock additive, a slip additive, a colorant, a filler, a processing aid, a UV inhibitor, or any combination thereof.

Aspect 67. The method defined in any one of aspects 64-66, wherein the pipe has a thickness in any range disclosed herein, e.g., from about 0.1 to about 5 inches, from about 0.5 to about 5 inches, from about 1 to about 4 inches, from about 2 to about 3 inches, etc.

Aspect 68. The method defined in any one of aspects 64-67, wherein the pipe has an outer diameter in any range disclosed herein, e.g., from about ¼ to about 100 inches, from about 12 to about 100 inches, from about 24 to about 63 inches, etc.

Aspect 69. The method defined in any one of aspects 64-68, wherein the pipe has a failure time of at least 1200 hr, at least 3400 hr, at least 7400 hr, etc., under chlorinated water conditions at 90° C. and 450 psi, in accordance with ASTM F2263-07e1.

Aspect 70. A pipe formed by the method defined in any one of aspects 64-69.

Aspect 71. A pipe formed by the method defined in any one of aspects 64-69, wherein the pipe is defined in any one of aspects 25-29.

We claim:

1. An ethylene polymer having:
    a density in a range from about 0.94 to about 0.955 g/cm$^3$;
    a HLMI ($I_{21}$) in a range from about 5 to about 15 g/10 min;
    a ratio of Mw/Mn in a range from about 13 to about 38;
    a zero-shear viscosity ($\eta_0$) at 190° C. in a range from about 25,000 to about 250,000 kPa-sec; and
    a relaxation time ($\tau_\eta$) at 190° C. in a range from about 250 to about 2500 sec.

2. The polymer of claim 1, wherein:
    the ethylene polymer comprises an ethylene/1-butene copolymer, an ethylene/1-hexene copolymer, an ethylene/1-octene copolymer, an ethylene homopolymer, or a combination thereof; and
    the ethylene polymer further comprises an additive selected from an antioxidant, an acid scavenger, an antiblock additive, a slip additive, a colorant, a filler, a processing aid, a UV inhibitor, or any combination thereof.

3. An article of manufacture comprising the polymer of claim 2.

4. The polymer of claim 2, wherein:
    the density is in a range from about 0.942 to about 0.952 g/cm$^3$;
    the zero-shear viscosity ($\eta_0$) at 190° C. is in a range from about 30,000 to about 215,000 kPa-sec; and
    the relaxation time ($\tau_\eta$) at 190° C. is in a range from about 300 to about 2000 sec.

5. The polymer of claim 2, wherein the ratio of Mw/Mn is in a range from about 16 to about 37.

6. The polymer of claim 5, wherein the ethylene polymer has a Mn in a range from about 10,200 to about 16,100 g/mol.

7. An article of manufacture comprising the polymer of claim 5.

8. The polymer of claim 1, wherein the ethylene polymer has:
    a CY-a parameter at 190° C. in a range from about 0.1 to about 0.18;
    a viscosity at 0.01 sec$^{-1}$ at 190° C. in a range from about 450 to about 750 kPa-sec; and
    a viscosity at 0.001 sec$^{-1}$ at 190° C. in a range from about 1000 to about 2300 kPa-sec.

9. The polymer of claim 8, wherein the ethylene polymer comprises an ethylene/α-olefin copolymer.

10. The polymer of claim 8, wherein the ethylene polymer comprises an ethylene/1-butene copolymer, an ethylene/1-hexene copolymer, an ethylene/1-octene copolymer, an ethylene homopolymer, or a combination thereof, and is further characterized by a Mn in a range from about 10,200 to about 16,100 g/mol.

11. A pipe comprising:
    an ethylene polymer characterized by a density in a range from about 0.94 to about 0.955 g/cm$^3$, a HLMI ($I_{21}$) in a range from about 5 to about 15 g/10 min, a ratio of Mw/Mn in a range from about 13 to about 38, a zero-shear viscosity ($\eta_0$) at 190° C. in a range from about 25,000 to about 250,000 kPa-sec, and a relaxation time ($\tau_\eta$) at 190° C. in a range from about 250 to about 2500 sec; and
    an additive selected from an antioxidant, an acid scavenger, an antiblock additive, a slip additive, a colorant, a filler, a processing aid, a UV inhibitor, or any combination thereof.

12. The pipe of claim 11, wherein the ethylene polymer comprises an ethylene/1-butene copolymer, an ethylene/1-hexene copolymer, an ethylene/1-octene copolymer, an ethylene homopolymer, or a combination thereof, and is further characterized by a CY-a parameter at 190° C. in a range from about 0.1 to about 0.18.

13. The pipe of claim 12, wherein the pipe comprises the colorant, and the colorant comprises carbon black.

14. The pipe of claim 12, wherein the pipe comprises:
    from about 1000 ppm to about 4500 ppm of a phenolic antioxidant; and
    from about 250 ppm to about 4000 ppm of a phosphite antioxidant.

15. The pipe of claim 14, wherein:
    the pipe has a thickness in a range from about 0.5 to about 5 inches;
    the pipe has an outer diameter in a range from about 12 to about 100 inches; and
    the pipe comprises from about 250 ppm to about 800 ppm of an acid scavenger, and from about 300 ppm to about 600 ppm of a processing aid.

16. The pipe of claim 12, wherein the pipe is characterized by:
    a failure time of at least 1200 hr under chlorinated water conditions at 90° C. and 450 psi;
    a failure time of at least 3400 hr under chlorinated water conditions at 90° C. and 450 psi;
    or a failure time of at least 7400 hr under chlorinated water conditions at 90° C. and 450 psi;
    or any combination thereof.

17. The pipe of claim 11, wherein:
    the density is in a range from about 0.942 to about 0.952 g/cm$^3$;
    the ratio of Mw/Mn is in a range from about 16 to about 37;
    the zero-shear viscosity ($\eta_0$) at 190° C. is in a range from about 30,000 to about 215,000 kPa-sec; and
    the relaxation time ($\tau_\eta$) at 190° C. is in a range from about 300 to about 2000 sec.

18. The pipe of claim 17, wherein:
    the ethylene polymer comprises an ethylene/α-olefin copolymer; and
    the pipe comprises the colorant, a phenolic antioxidant, and a phosphite antioxidant.

19. The pipe of claim 18, wherein the ethylene polymer has:
    a CY-a parameter at 190° C. in a range from about 0.1 to about 0.18;
    a viscosity at 0.01 sec$^{-1}$ at 190° C. in a range from about 450 to about 750 kPa-sec; and
    a viscosity at 0.001 sec$^{-1}$ at 190° C. in a range from about 1000 to about 2300 kPa-sec.

20. The pipe of claim 19, wherein the ethylene/α-olefin copolymer comprises an ethylene/1-butene copolymer, an ethylene/1-hexene copolymer, an ethylene/1-octene copolymer, or a combination thereof.

21. The pipe of claim 20, wherein the pipe comprises:
    from about 250 ppm to about 800 ppm of an acid scavenger; and
    from about 300 ppm to about 600 ppm of a processing aid.

* * * * *